US009720082B1

(12) United States Patent
Dana et al.

(10) Patent No.: US 9,720,082 B1
(45) Date of Patent: Aug. 1, 2017

(54) WEATHER RADAR SYSTEM AND METHOD FOR DETECTING A HIGH ALTITUDE CRYSTAL CONDITION USING TWO OR MORE TYPES OF RADAR SIGNALS

(71) Applicants: Roger A. Dana, Marion, IA (US); James B. West, Cedar Rapids, IA (US); Kevin M. Kronfeld, Cedar Rapids, IA (US); Gregory J. Koenigs, Cedar Rapids, IA (US); Jeffery A. Finley, Cedar Rapids, IA (US); Daniel L. Woodell, Holtz Summit, MO (US)

(72) Inventors: Roger A. Dana, Marion, IA (US); James B. West, Cedar Rapids, IA (US); Kevin M. Kronfeld, Cedar Rapids, IA (US); Gregory J. Koenigs, Cedar Rapids, IA (US); Jeffery A. Finley, Cedar Rapids, IA (US); Daniel L. Woodell, Holtz Summit, MO (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 397 days.

(21) Appl. No.: 14/206,651

(22) Filed: Mar. 12, 2014

(51) Int. Cl.
  *G01S 13/95* (2006.01)
  *B64D 15/20* (2006.01)

(52) U.S. Cl.
  CPC ............ *G01S 13/953* (2013.01); *B64D 15/20* (2013.01)

(58) Field of Classification Search
  CPC ............................... G01S 13/953; B64D 15/20
  USPC ...................................... 342/26 R–26 D, 188
  See application file for complete search history.

(56) References Cited

U.S. PATENT DOCUMENTS

| 650,275 A | 5/1900 | Reeve |
| 3,251,057 A | 5/1966 | Buehler et al. |
| 3,359,557 A | 12/1967 | Fow et al. |
| 3,404,396 A | 10/1968 | Buchler et al. |
| 3,465,339 A | 9/1969 | Marner |
| 3,491,358 A | 1/1970 | Hicks |
| 3,508,259 A | 4/1970 | Andrews |
| 3,540,829 A | 11/1970 | Collinson et al. |
| 3,567,915 A | 3/1971 | Altshuler et al. |
| 3,646,555 A | 2/1972 | Atlas |
| 3,715,748 A | 2/1973 | Hicks |
| 3,764,719 A | 10/1973 | Dell |

(Continued)

FOREIGN PATENT DOCUMENTS

| EP | 1 329 738 B1 | 7/2003 |
| FR | 2658617 A1 | 8/1991 |

(Continued)

OTHER PUBLICATIONS

3-D Weather Hazard and Avoidance System, Honeywell InteVue Brochure dated Nov. 2008, 4 pages.

(Continued)

*Primary Examiner* — Marcus Windrich
(74) *Attorney, Agent, or Firm* — Donna P. Suchy; Daniel M. Barbieri

(57) ABSTRACT

The hazard warning system that included processing system for detecting a high altitude ice crystal (HAIC) condition. The aircraft warning system can use at least two types of radar returns to detect the HAIC condition. Warnings of high altitude ice crystal conditions can allow an aircraft to avoid threats posed by HAIC conditions including damage to aircraft equipment and engines.

20 Claims, 8 Drawing Sheets

(56) References Cited

U.S. PATENT DOCUMENTS

| | | |
|---|---|---|
| 3,781,530 A | 12/1973 | Britland et al. |
| 3,781,878 A | 12/1973 | Kirkpatrick |
| 3,803,609 A | 4/1974 | Lewis et al. |
| 3,885,237 A | 5/1975 | Kirkpatrick |
| 3,943,511 A | 3/1976 | Evans et al. |
| 3,964,064 A | 6/1976 | Brandao et al. |
| 3,968,490 A | 7/1976 | Gostin |
| 4,015,257 A | 3/1977 | Fetter |
| 4,043,194 A | 8/1977 | Tanner |
| 4,223,309 A | 9/1980 | Payne |
| 4,283,715 A | 8/1981 | Choisnet |
| 4,283,725 A | 8/1981 | Chisholm |
| 4,318,100 A | 3/1982 | Shimizu et al. |
| 4,346,595 A | 8/1982 | Frosch et al. |
| 4,430,654 A | 2/1984 | Kupfer |
| 4,435,707 A | 3/1984 | Clark |
| 4,459,592 A | 7/1984 | Long |
| 4,533,915 A | 8/1985 | Lucchi et al. |
| 4,555,703 A | 11/1985 | Cantrell |
| 4,600,925 A | 7/1986 | Alitz et al. |
| 4,613,937 A | 9/1986 | Batty, Jr. |
| 4,613,938 A | 9/1986 | Hansen et al. |
| 4,649,388 A | 3/1987 | Atlas |
| 4,658,255 A | 4/1987 | Nakamura et al. |
| 4,684,950 A | 8/1987 | Long |
| 4,742,353 A | 5/1988 | D'Addio et al. |
| 4,761,650 A | 8/1988 | Masuda et al. |
| 4,835,536 A | 5/1989 | Piesinger et al. |
| RE33,152 E | 1/1990 | Atlas |
| 4,914,444 A | 4/1990 | Pifer et al. |
| 4,928,131 A | 5/1990 | Onozawa |
| 4,940,987 A | 7/1990 | Frederick |
| 5,036,334 A | 7/1991 | Henderson et al. |
| 5,049,886 A | 9/1991 | Seitz et al. |
| 5,057,820 A | 10/1991 | Markson et al. |
| 5,077,558 A | 12/1991 | Kuntman |
| 5,105,191 A | 4/1992 | Keedy |
| 5,159,407 A | 10/1992 | Churnside et al. |
| 5,164,731 A | 11/1992 | Borden et al. |
| 5,173,704 A | 12/1992 | Buehler et al. |
| 5,177,487 A | 1/1993 | Taylor et al. |
| 5,198,819 A | 3/1993 | Susnjara |
| 5,202,690 A | 4/1993 | Frederick |
| 5,208,600 A | 5/1993 | Rubin |
| 5,221,924 A | 6/1993 | Wilson, Jr. |
| 5,262,773 A | 11/1993 | Gordon |
| 5,291,208 A | 3/1994 | Young |
| 5,296,865 A | 3/1994 | Lewis |
| 5,311,183 A | 5/1994 | Mathews et al. |
| 5,311,184 A | 5/1994 | Kuntman |
| 5,331,330 A | 7/1994 | Susnjara |
| 5,396,220 A | 3/1995 | Markson et al. |
| 5,402,116 A | 3/1995 | Ashley |
| 5,469,168 A | 11/1995 | Anderson |
| 5,479,173 A | 12/1995 | Yoshioka et al. |
| 5,485,157 A | 1/1996 | Long |
| 5,517,193 A | 5/1996 | Allison et al. |
| 5,521,603 A | 5/1996 | Young |
| 5,534,868 A | 7/1996 | Gjessing et al. |
| 5,568,151 A | 10/1996 | Merritt |
| 5,583,972 A | 12/1996 | Miller |
| 5,592,171 A | 1/1997 | Jordan |
| 5,602,543 A | 2/1997 | Prata et al. |
| 5,615,118 A | 3/1997 | Frank |
| 5,648,782 A | 7/1997 | Albo et al. |
| 5,654,700 A | 8/1997 | Prata et al. |
| 5,657,009 A | 8/1997 | Gordon |
| 5,686,919 A | 11/1997 | Jordan et al. |
| 5,726,656 A | 3/1998 | Frankot |
| 5,757,322 A | 5/1998 | Ray et al. |
| 5,771,020 A | 6/1998 | Markson et al. |
| 5,828,332 A | 10/1998 | Frederick |
| 5,838,239 A | 11/1998 | Stern et al. |
| 5,839,080 A | 11/1998 | Muller et al. |
| 5,907,568 A * | 5/1999 | Reitan, Jr. ............... G01S 7/22 342/181 |
| 5,920,276 A | 7/1999 | Frederick |
| 5,945,926 A | 8/1999 | Ammar et al. |
| 5,973,635 A | 10/1999 | Albo |
| 6,034,760 A | 3/2000 | Rees |
| 6,043,756 A | 3/2000 | Bateman et al. |
| 6,043,757 A | 3/2000 | Patrick |
| 6,081,220 A | 6/2000 | Fujisaka et al. |
| 6,138,060 A | 10/2000 | Conner et al. |
| 6,154,151 A | 11/2000 | McElreath et al. |
| 6,154,169 A | 11/2000 | Kuntman |
| 6,177,873 B1 | 1/2001 | Cragun |
| 6,184,816 B1 | 2/2001 | Zheng et al. |
| 6,201,494 B1 | 3/2001 | Kronfeld |
| 6,208,284 B1 | 3/2001 | Woodell et al. |
| 6,236,351 B1 | 5/2001 | Conner et al. |
| 6,240,369 B1 | 5/2001 | Foust |
| 6,246,367 B1 | 6/2001 | Markson et al. |
| 6,281,832 B1 | 8/2001 | McElreath |
| 6,289,277 B1 | 9/2001 | Feyereisen et al. |
| 6,297,772 B1 | 10/2001 | Lewis |
| 6,339,747 B1 | 1/2002 | Daly et al. |
| 6,340,946 B1 | 1/2002 | Wolfson et al. |
| 6,377,202 B1 * | 4/2002 | Kropfli ............... G01S 7/024 342/175 |
| 6,377,207 B1 * | 4/2002 | Solheim ............... G01W 1/02 324/640 |
| 6,381,538 B1 | 4/2002 | Robinson et al. |
| 6,388,607 B1 | 5/2002 | Woodell |
| 6,388,608 B1 | 5/2002 | Woodell et al. |
| RE37,725 E | 6/2002 | Yamada |
| 6,405,134 B1 | 6/2002 | Smith et al. |
| 6,424,288 B1 | 7/2002 | Woodell |
| 6,441,773 B1 | 8/2002 | Kelly et al. |
| 6,456,226 B1 | 9/2002 | Zheng et al. |
| 6,480,142 B1 | 11/2002 | Rubin |
| 6,496,252 B1 | 12/2002 | Whiteley |
| 6,501,392 B2 | 12/2002 | Gremmert et al. |
| 6,512,476 B1 | 1/2003 | Woodell |
| 6,518,914 B1 | 2/2003 | Peterson et al. |
| 6,549,161 B1 | 4/2003 | Woodell |
| 6,560,538 B2 | 5/2003 | Schwinn et al. |
| 6,563,452 B1 | 5/2003 | Zheng et al. |
| 6,577,947 B1 | 6/2003 | Kronfeld et al. |
| 6,590,520 B1 | 7/2003 | Steele et al. |
| 6,597,305 B2 | 7/2003 | Szeto et al. |
| 6,603,425 B1 | 8/2003 | Woodell |
| 6,606,564 B2 | 8/2003 | Schwinn et al. |
| 6,614,382 B1 | 9/2003 | Cannaday et al. |
| 6,650,275 B1 | 11/2003 | Kelly et al. |
| 6,650,972 B1 | 11/2003 | Robinson et al. |
| 6,667,710 B2 | 12/2003 | Cornell et al. |
| 6,670,908 B2 | 12/2003 | Wilson et al. |
| 6,677,886 B1 | 1/2004 | Lok |
| 6,683,609 B1 | 1/2004 | Baron et al. |
| 6,690,317 B2 | 2/2004 | Szeto et al. |
| 6,703,945 B2 | 3/2004 | Kuntman et al. |
| 6,720,906 B2 | 4/2004 | Szeto et al. |
| 6,738,010 B2 | 5/2004 | Steele et al. |
| 6,741,203 B1 | 5/2004 | Woodell |
| 6,744,382 B1 | 6/2004 | Lapis et al. |
| 6,771,207 B1 | 8/2004 | Lang |
| 6,788,043 B2 | 9/2004 | Murphy et al. |
| 6,791,311 B2 | 9/2004 | Murphy et al. |
| 6,828,922 B1 | 12/2004 | Gremmert et al. |
| 6,828,923 B2 | 12/2004 | Anderson |
| 6,839,018 B2 | 1/2005 | Szeto et al. |
| 6,850,185 B1 | 2/2005 | Woodell |
| 6,856,908 B2 | 2/2005 | Devarasetty et al. |
| 6,879,280 B1 | 4/2005 | Bull et al. |
| 6,882,302 B1 | 4/2005 | Woodell et al. |
| 6,917,860 B1 | 7/2005 | Robinson et al. |
| 6,977,608 B1 | 12/2005 | Anderson et al. |
| 7,030,805 B2 | 4/2006 | Ormesher et al. |
| 7,042,387 B2 | 5/2006 | Ridenour et al. |
| 7,082,382 B1 | 7/2006 | Rose et al. |
| 7,109,912 B1 | 9/2006 | Paramore et al. |
| 7,109,913 B1 | 9/2006 | Paramore et al. |

(56) References Cited

U.S. PATENT DOCUMENTS

| | | | |
|---|---|---|---|
| 7,116,266 B1 | 10/2006 | Vesel et al. | |
| 7,129,885 B1 | 10/2006 | Woodell et al. | |
| 7,132,974 B1 | 11/2006 | Christianson | |
| 7,139,664 B2 | 11/2006 | Kelly et al. | |
| 7,145,503 B2 | 12/2006 | Abramovich et al. | |
| 7,161,525 B1* | 1/2007 | Finley | G01S 7/062 342/179 |
| 7,200,491 B1 | 4/2007 | Rose et al. | |
| 7,205,928 B1 | 4/2007 | Sweet | |
| 7,242,343 B1* | 7/2007 | Woodell | G01S 7/41 342/26 B |
| 7,259,714 B1 | 8/2007 | Cataldo | |
| 7,292,178 B1 | 11/2007 | Woodell et al. | |
| 7,307,576 B1 | 12/2007 | Koenigs | |
| 7,307,577 B1* | 12/2007 | Kronfeld | G01S 7/411 342/118 |
| 7,307,583 B1 | 12/2007 | Woodell et al. | |
| 7,307,586 B2 | 12/2007 | Peshlov et al. | |
| 7,307,756 B2 | 12/2007 | Walmsley | |
| 7,352,317 B1 | 4/2008 | Finley et al. | |
| 7,352,929 B2 | 4/2008 | Hagen et al. | |
| 7,365,674 B2 | 4/2008 | Tillotson et al. | |
| 7,372,394 B1* | 5/2008 | Woodell | G01S 7/292 342/26 B |
| 7,383,131 B1 | 6/2008 | Wey et al. | |
| 7,417,578 B1 | 8/2008 | Woodell et al. | |
| 7,417,579 B1 | 8/2008 | Woodell | |
| 7,427,943 B1 | 9/2008 | Kronfeld et al. | |
| 7,436,361 B1 | 10/2008 | Paulsen et al. | |
| 7,471,995 B1 | 12/2008 | Robinson | |
| 7,486,219 B1 | 2/2009 | Woodell et al. | |
| 7,486,220 B1 | 2/2009 | Kronfeld et al. | |
| 7,492,304 B1* | 2/2009 | Woodell | G01S 7/285 342/175 |
| 7,492,305 B1 | 2/2009 | Woodell et al. | |
| 7,515,087 B1 | 4/2009 | Woodell et al. | |
| 7,515,088 B1 | 4/2009 | Woodell et al. | |
| 7,528,613 B1 | 5/2009 | Thompson et al. | |
| 7,541,971 B1 | 6/2009 | Woodell et al. | |
| 7,557,735 B1 | 7/2009 | Woodell et al. | |
| 7,576,680 B1 | 8/2009 | Woodell | |
| 7,581,441 B2 | 9/2009 | Barny et al. | |
| 7,598,901 B2 | 10/2009 | Tillotson et al. | |
| 7,598,902 B1 | 10/2009 | Woodell et al. | |
| 7,633,428 B1 | 12/2009 | McCusker et al. | |
| 7,633,431 B1 | 12/2009 | Wey et al. | |
| 7,664,601 B2 | 2/2010 | Daly, Jr. | |
| 7,696,921 B1 | 4/2010 | Finley et al. | |
| 7,714,767 B1 | 5/2010 | Kronfeld et al. | |
| 7,728,758 B2 | 6/2010 | Varadarajan et al. | |
| 7,733,264 B1 | 6/2010 | Woodell et al. | |
| 7,859,448 B1 | 12/2010 | Woodell et al. | |
| 7,868,811 B1* | 1/2011 | Woodell | G01S 7/22 342/175 |
| 7,917,255 B1 | 3/2011 | Finley | |
| 7,932,853 B1 | 4/2011 | Woodell et al. | |
| 7,973,698 B1 | 7/2011 | Woodell et al. | |
| 7,982,658 B2 | 7/2011 | Kauffman et al. | |
| 8,022,859 B2 | 9/2011 | Bunch et al. | |
| 8,054,214 B2 | 11/2011 | Bunch | |
| 8,072,368 B1 | 12/2011 | Woodell | |
| 8,081,106 B2 | 12/2011 | Yannone | |
| 8,089,391 B1 | 1/2012 | Woodell et al. | |
| 8,098,188 B2 | 1/2012 | Costes et al. | |
| 8,098,189 B1 | 1/2012 | Woodell et al. | |
| 8,111,186 B2 | 2/2012 | Bunch et al. | |
| 8,159,369 B1 | 4/2012 | Koenigs et al. | |
| 8,217,828 B2 | 7/2012 | Kirk | |
| 8,228,227 B2 | 7/2012 | Bunch et al. | |
| 8,314,730 B1 | 11/2012 | Musiak et al. | |
| 8,332,084 B1 | 12/2012 | Bailey et al. | |
| 8,902,100 B1 | 12/2014 | Woodell et al. | |
| 9,019,146 B1 | 4/2015 | Finley et al. | |
| 2002/0039072 A1 | 4/2002 | Gremmert et al. | |
| 2002/0126039 A1 | 9/2002 | Dalton et al. | |
| 2003/0001770 A1 | 1/2003 | Cornell et al. | |
| 2003/0025627 A1 | 2/2003 | Wilson et al. | |
| 2003/0117311 A1* | 6/2003 | Funai | G01S 13/26 342/26 R |
| 2003/0193411 A1 | 10/2003 | Price | |
| 2004/0183695 A1 | 9/2004 | Ruokangas et al. | |
| 2004/0239550 A1 | 12/2004 | Daly, Jr. | |
| 2005/0049789 A1 | 3/2005 | Kelly et al. | |
| 2005/0174350 A1 | 8/2005 | Ridenour et al. | |
| 2006/0036366 A1 | 2/2006 | Kelly et al. | |
| 2007/0005249 A1 | 1/2007 | Dupree et al. | |
| 2007/0152867 A1* | 7/2007 | Randall | G01S 7/024 342/26 R |
| 2008/0158049 A1 | 7/2008 | Southard et al. | |
| 2009/0177343 A1 | 7/2009 | Bunch et al. | |
| 2009/0219197 A1 | 9/2009 | Bunch | |
| 2010/0019938 A1 | 1/2010 | Bunch | |
| 2010/0042275 A1 | 2/2010 | Kirk | |
| 2010/0110431 A1* | 5/2010 | Ray | B64D 15/20 356/342 |
| 2010/0194628 A1 | 8/2010 | Christianson et al. | |
| 2010/0201565 A1 | 8/2010 | Khatwa | |
| 2010/0245164 A1 | 9/2010 | Kauffman | |
| 2010/0302094 A1 | 12/2010 | Bunch et al. | |
| 2011/0074624 A1 | 3/2011 | Bunch | |
| 2011/0148692 A1 | 6/2011 | Christianson | |
| 2011/0148694 A1 | 6/2011 | Bunch et al. | |
| 2012/0029786 A1 | 2/2012 | Calandra et al. | |
| 2012/0133551 A1 | 5/2012 | Pujol et al. | |
| 2012/0139778 A1 | 6/2012 | Bunch et al. | |
| 2013/0226452 A1 | 8/2013 | Watts | |
| 2013/0234884 A1* | 9/2013 | Bunch | G01W 1/00 342/26 B |
| 2014/0176362 A1 | 6/2014 | Sneed | |
| 2014/0362088 A1 | 12/2014 | Veillette et al. | |

FOREIGN PATENT DOCUMENTS

| | | |
|---|---|---|
| WO | WO-98/07047 A1 | 2/1998 |
| WO | WO-98/22834 | 5/1998 |
| WO | WO-03/005060 | 1/2003 |
| WO | WO-2009/137158 | 11/2009 |

OTHER PUBLICATIONS

Advisory Action for U.S. Appl. No. 12/075,103, mail date Feb. 13, 2013, 3 pages.

Advisory Action for U.S. Appl. No. 12/075,103, mail date Nov. 8, 2010, 3 pages.

Advisory Action for U.S. Appl. No. 12/075,103, mail date Oct. 15, 2010, 3 pages.

U.S. Appl. No. 12/075,103, filed Mar. 7, 2008, Woodell et al.

U.S. Appl. No. 13/841,893, filed Mar. 15, 2013, Rockwell Collins, Inc.

U.S. Appl. No. 13/919,406, filed Jun. 17, 2013, Rockwell Collins, Inc.

U.S. Appl. No. 14/086,844, filed Nov. 21, 2013, Rockwell Collins, Inc.

U.S. Appl. No. 14/206,239, filed Mar. 12, 2014, Rockwell Collins.

U.S. Appl. No. 14/206,651, filed Mar. 12, 2014, Rockwell Collins, Inc.

U.S. Appl. No. 14/207,034, filed Mar. 12, 2014, Rockwell Collins, Inc.

Bovith et al., Detecting Weather Radar Clutter by Information Fusion with Satellite Images and Numerical Weather Prediction Model Output; Jul. 31-Aug. 4, 2006, 4 pages.

Burnham et al., Thunderstorm Turbulence and Its Relationship to Weather Radar Echoes, J. Aircraft, Sep.-Oct. 1969, 8 pages.

Corridor Integrated Weather System (CIWS), www.ll.mit.edu/mission/aviation/faawxsystems/ciws.html, 3 pages.

Doviak et al., Doppler Radar and Weather Observations, 1984, 298 pages.

Dupree et al., FAA Tactical Weather Forecasting in the United States National Airspace, 29 pages.

(56) References Cited

OTHER PUBLICATIONS

Goodman et al., LISDAD Lightning Observations during the Feb. 22-23, 1998 Central Florida Tornado Outbreak, http:www.srh.noaa.gov/topics/attach/html/ssd98-37.htm, Jun. 1, 1998, 5 pages.
Greene et al., Vertically Integrated Liquid Water—A New Analysis Tool, Monthly Weather Review, Jul. 1972, 5 pages.
Hodanish, Integration of Lightning Detection Systems in a Modernized National Weather Service Office, http://www.srh.noaa.gov/mlb/hoepub.html, retrieved on Aug. 6, 2007, 5 pages.
Honeywell, RDR-4B Forward Looking Windshear Detection/Weather Radar System User's Manual with Radar Operation Guidelines, Jul. 2003.
Keith, Transport Category Airplane Electronic Display Systems, Jul. 16, 1987, 34 pages.
Klingle-Wilson et al., Description of Corridor Integrated Weather System (CIWS) Weather Products, Aug. 1, 2005, 120 pages.
Kuntman et al, Turbulence Detection and Avoidance System, Flight Safety Foundation 53rd International Air Safety Seminar (IASS), Oct. 29, 2000.
Kuntman, Airborne System to Address Leading Cause of Injuries in Non-Fatal Airline Accidents, ICAO Journal, Mar. 2000.
Kuntman, Satellite Imagery: Predicting Aviation Weather Hazards, ICAO Journal, Mar. 2000, 4 pps.
Meteorological/KSC/L71557/Lighting Detection and Ranging (LDAR), Jan. 2002, 12 pages.
Nathanson, Fred E., "Radar and Its Composite Environment," Radar Design Principles, Signal Processing and the Environment, 1969, 5 pages, McGraw-Hill Book Company, New York et al.
Notice of Allowance for U.S. Appl. No. 10/631,253, mail date Jul. 28, 2005, 7 pages.
Notice of Allowance for U.S. Appl. No. 11/256,845, mail date May 27, 2009, 7 pages.
Notice of Allowance for U.S. Appl. No. 11/370,085, mail date Dec. 30, 2008, 6 pages.
Notice of Allowance for U.S. Appl. No. 11/402,434, mail date Nov. 4, 2008, 6 pages.
Notice of Allowance for U.S. Appl. No. 12/474,102, mail date Jan. 20, 2012, 6 pages.
Office Action for U.S. Appl. 11/256,845, mail date Aug. 21, 2007, 4 pages.
Office Action for U.S. Appl. No. 10/631,253, mail date Jan. 14, 2004, 5 pages.
Office Action for U.S. Appl. No. 10/631,253, mail date Jun. 30, 2004, 4 pages.
Office Action for U.S. Appl. No. 11/256,845, mail date Dec. 5, 2006, 5 pages.
Office Action for U.S. Appl. No. 11/256,845, mail date Jul. 28, 2008, 5 pages.
Office Action for U.S. Appl. No. 11/256,845, mail date Jun. 22, 2006, 5 pages.
Office Action for U.S. Appl. No. 11/370,085, mail date Aug. 15, 2007, 10 pages.
Office Action for U.S. Appl. No. 11/370,085, mail date Dec. 4, 2007, 13 pages.
Office Action for U.S. Appl. No. 11/370,085, mail date Oct. 9, 2008, 5 pages.
Office Action for U.S. Appl. No. 11/402,434, mail date Jul. 17, 2008, 5 pages.
Office Action for U.S. Appl. No. 11/402,434, mail date Mar. 29, 2007, 8 pages.
Office Action for U.S. Appl. No. 11/402,434, mail date Oct. 26, 2006, 7 pages.
Office Action for U.S. Appl. No. 11/402,434, mail date Sep. 20, 2007, 7 pages.
Office Action for U.S. Appl. No. 12/075,103, mail date Feb. 26, 2010, 11 pages.
Office Action for U.S. Appl. No. 12/075,103, mail date Jul. 29, 2010, 7 pages.
Office Action for U.S. Appl. No. 12/075,103, mail date Jun. 20, 2012, 5 pages.
Office Action for U.S. Appl. No. 12/075,103, mail date Nov. 29, 2012, 6 pages.
Office Action for U.S. Appl. No. 12/474,102, mail date Sep. 7, 2011, 8 pages.
Office Action for U.S. Appl. No. 13/717,052, mail date Aug. 22, 2013, 15 pages.
Office Action on U.S. Appl. No. 12/075,103 Dated Apr. 9, 2014, 5 pages.
Office Action on U.S. Appl. No. 12/075,103 Dated Jul. 31, 2013, 8 pages.
Office Action on U.S. Appl. No. 13/246,769 Dated Apr. 21, 2014, 18 pages.
Office Action on U.S. Appl. No. 13/717,052 Dated Dec. 23, 2013, 7 pages.
Pessi et al., On the Relationship Between Lightning and Convective Rainfall Over the Central Pacific Ocean, date unknown, 9 pages.
RDR-4B Honeywell User Manual for Forward Looking Windshear Detection/Weather Radar System, Rev. 6, Jul. 2003, 106 pps.
Robinson et al., En Route Weather Depiction Benefits of the Nexrad Vertically Integrated Liquid Water Product Utilized by the Corridor Integrated Weather System, 10th Conference on Aviation, Range, and Aerospace Meteorology (ARAM), 2002, 4 pages.
Stormscope Lightning Detection Systems, L3 Avionics Systems, retrieved on Jul. 11, 2011, 6 pages.
Office Action on U.S. Appl. No. 13/717,052 Dated Mar. 27, 2014, 6 pages.
Waldvogel et al., The Kinetic Energy of Hailfalls. Part I: Hailstone Spectra, Journal of Applied Meteorology, Apr. 1978, 8 pages.
Wilson et al., The Complementary Use of Titan-Derived Radar and Total Lightning Thunderstorm Cells, 10 pages.
Zipser et al., The Vertical Profile of Radar Reflectivity and Convective Cells: A Strong Indicator of Storm Intensity and Lightning Probability? America Meteorological Society, 1994, 9 pages.
Final Office Action on U.S. Appl. No. 13/246,769 Dated Sep. 16, 2014, 18 pages.
Non-Final Office Action on U.S. Appl. No. 13/717,052 Dated Sep. 9, 2014, 8 pages.
Notice of Allowance on U.S. Appl. No. 12/075,103 Dated Aug. 4, 2014, 10 pages.
U.S. Appl. No. 13/717,052, filed Dec. 17, 2012, Woodell et al.
U.S. Appl. No. 13/837,538, filed Mar. 15, 2013, Kronfeld et al.
U.S. Appl. No. 14/162,035, filed Jan. 23, 2014, Kronfeld et al.
U.S. Appl. No. 14/323,766, filed Jul. 3, 2014, Weichbrod et al.
U.S. Appl. No. 14/465,730, filed Aug. 21, 2014, Breiholz et al.
U.S. Appl. No. 14/465,753, filed Aug. 21, 2014, Breiholz et al.
U.S. Appl. No. 14/608,071, filed Jan. 28, 2015, Breiholz et al.
Boudevillain et al., 2003, Assessment of Vertically Integrated Liquid (VIL) Water Content Radar Measurement, J. Atmos. Oceanic Technol., 20, 807-819.
Final Office Action on U.S. Application No. 13/238,606 Dated Jan. 22, 2015, 6 pages.
Greene et al., 1972, Vertically Integrated Water-A New Analysis Tool, Mon. Wea. Rev., 100, 548-552.
Lahiff, 2005, Vertically Integrated Liquid Density and Its Associated Hail Size Range Across the Burlington, Vermont County Warning Area, Eastern Regional Technical Attachment, No. 05-01, 20 pages.
Liu, Chuntao et al., Relationships between lightning flash rates and radar reflectivity vertical structures in thunderstorms over the tropics and subtropics, Journal of Geophysical Research, vol. 177, D06212, doi:10.1029/2011JDo17123,2012, American Geophysical Union, 2012, 19 pages.
Non-Final Office Action on U.S. Appl. No. 13/238,606 Dated Mar. 27, 2015, 21 pages.
Non-Final Office Action on U.S. Appl. No. 14/162,035, dated Feb. 4, 2016, 9 pages.
Non-Final Office Action on U.S. Appl. No. 14/086,844, dated Nov. 10, 2015, 17 pages.
Notice of Allowance on U.S. Appl. No. 14/681,901, dated Dec. 23, 2015, 8 pages.

(56) References Cited

OTHER PUBLICATIONS

Zipser, Edward J. et al., The Vertical Profile of Radar Reflectivity of Convective Cells: A Strong Indicator of Storm Intensity and Lightning Probability?, American Meteorological Society, Aug. 1994, 9 pages.
U.S. Appl. No. 13/246,769, filed Sep. 27, 2011, Rockwell Collins.
Non-Final Office Action on U.S. Appl. No. 13/238,606 Dated May 27, 2015, 14 pages.
Non-Final Office Action on U.S. Appl. No. 14/452,235 Dated Apr. 23, 2015, 9 pages.
Non-Final Office Action on U.S. Appl. No. 14/681,901 Dated Jun. 17, 2015, 21 pages.
Non-Final Office Action on U.S. Appl. No. 13/841,893 Dated Jun. 22, 2015, 27 pages.
Non-Final Office Action on U.S. Appl. No. 13/913,100 Dated May 4, 2015, 25 pages.
Non-Final Office Action on U.S. Appl. No. 13/919,406 Dated Jul. 14, 2015, 23 pages.
Decision on Appeal for Inter Parties Reexamination Control No. 95/001,860, dated Oct. 17, 2014, 17 pages.
Final Office Action on U.S. Appl. No. 12,892,663 dated Mar. 7, 2013, 13 pages.
Final Office Action on U.S. Appl. No. 13/238,606 Dated Apr. 1, 2014, 11 pages.
Final Office Action on U.S. Appl. No. 13/238,606 Dated Jan. 22, 2015, 6 pages.
Non-Final Office Action on U.S. Appl. No. 12/892,663 Dated May 29, 2013, 14 pages.
Non-Final Office Action on U.S. Appl. No. 13/238,606 Dated Jul. 8, 2014, 12 pages.
Non-Final Office Action on U.S. Appl. No. 13/238,606 Dated Sep. 23, 2013, 15 pages.
Non-Final Office Action on U.S. Appl. No. 13/717,052 Dated Feb. 11, 2015, 15 pages.
Notice of Allowance on U.S. Appl. No. 13/246,769 Dated Jan. 8, 2015, 10 pages.
Notice of Allowance on U.S. Appl. No. 13/707,438 Dated Feb. 25, 2015, 11 pages.
Office Action for U.S. Appl. No. 12/892,663, mail date Oct. 22, 2012, 12 pages.
TOA Technology, printed from website: http://www.toasystems.com/technology.html on Dec. 29, 2010, 2 pages.
Triangulation, from Wikipedia, printed from website: http://en.wikipedia.org/wiki/Triangulation on Dec. 29, 2010, 6 pages.
Final Office Action on U.S. Appl. No. 13/717,052, dated Nov. 13, 2015, 10 pages.
Non-Final Office Action on U.S. Appl. No. 14/162,035 dated Jul. 11, 2016, 10 pages.
Non-Final Office Action on U.S. Appl. No. 14/206,239 dated Jun. 16, 2016, 12 pages.
Non-Final Office Action on U.S. Appl. No. 14/207,034 dated Jun. 23, 2016, 14 pages.
Non-Final Office Action on U.S. Appl. No. 14/465,753, dated Apr. 4, 2016, 12 pages.
Non-Final Office Action on U.S. Appl. No. 15/137,645 dated Aug. 8, 2016, 6 pages.
Notice of Allowance on U.S. Appl. No. 14/086,844, dated Jun. 22, 2016, 8 pages.
Notice of Allowance on U.S. Appl. No. 14/465,753, dated Aug. 29, 2016, 8 pages.

\* cited by examiner

WEATHER RADAR SYSTEM AND METHOD FOR DETECTING A HIGH ALTITUDE CRYSTAL CONDITION USING TWO OR MORE TYPES OF RADAR SIGNALS

CROSS REFERENCE TO RELATED APPLICATIONS

The present application is related to U.S. application Ser. No. 14/086,844 filed on Nov. 21, 2013 now U.S. Pat. No. 9,244,166, U.S. application Ser. No. 13/919,406 filed on Jun. 17, 2013 now U.S. Pat. No. 9,244,157, U.S. application Ser. No. 13/841,893 filed Mar. 15, 2013 now U.S. Pat. No. 9,244,166, U.S. application Ser. No. 14/207,034 filed on an even date herewith invented by Koenigs, et al., U.S. application Ser. No. 13/246,769 filed Sep. 27, 2011 now U.S. Pat. No. 9,019,146 and U.S. application Ser. No. 14/206,239, filed on an even date herewith invented by Sishtla, et al., all incorporated herein by reference in their entireties and assigned to the assignee of the present application.

BACKGROUND

This specification relates generally to the detection of weather radar hazard. More particularly, this specification relates to the detection of a weather hazard warning related to ice crystals.

Conventional aircraft hazard weather radar systems, such as the WXR 2100 MultiScan™ radar system manufactured by Rockwell Collins, Inc., have Doppler processing and are capable of detecting at least four parameters: weather range, weather reflectivity, weather velocity, and weather spectral width or velocity variation. The weather reflectivity is typically scaled to green, yellow, and red color levels that are related to rainfall rate. The radar-detected radial velocity variation can be scaled to a turbulence level and displayed as magenta. Such weather radar systems can conduct vertical sweeps and obtain reflectivity parameters at various altitudes.

Ice crystals pose threats to aircraft and their components. For example, sensors can provide improper readings when clogged by ice. Probes and engines can also be susceptible to damage caused by mixed phase and glaciated ice crystals when operating near areas of deep convection and at higher altitudes. Engine rollback issues are believed to be related to ice crystal accretion, followed by aggregate detachment in solid form before continuing through the aircraft engine. High efficiency engines are believed to be more susceptible to damage caused by ice crystals.

Radar reflectivity levels in and around the convective regions at high altitudes associated with high altitude, thin ice crystal formation have typically been very low and can be difficult to detect. Conventional X-band radar systems have insufficient energy on the target to detect and discriminate high altitude ice crystal clouds based upon reflectivity levels alone. It is difficult to distinguish low reflectivity precipitation areas from areas of high altitude ice crystal (HAIC) formation and HAIC clouds (HAIC$^2$). Detection and display of high altitude ice crystallization areas is desirous because the icing events caused by HAIC and/or high altitude ice crystal cloud (HAIC$^2$) conditions can have a direct impact on aircraft, crew and passengers depending on the severity of the accretion.

Thus, there is a need for an aircraft hazard warning system and method that senses high altitude ice crystal (HAIC) or high altitude ice crystal cloud (HAIC$^2$) conditions. There is also a need for a hazard detection system that detects and displays high altitude associated threat (HAIC) or high altitude ice crystal cloud (HAIC$^2$) warnings. There is also a need for a direct (non-inferred) HAIC or HAIC$^2$ detection system and method. Yet further, there is a need for an aircraft hazard warning system that alerts a pilot to HAIC or HAIC$^2$ conditions and can detect such conditions at a distance large enough to allow aircraft route changes.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY

An exemplary embodiment relates to an aircraft hazard warning system. The aircraft hazard warning system includes a processing system for detecting a high altitude ice crystal (HAIC) condition.

An exemplary embodiment relates to an aircraft hazard warning system. The aircraft hazard warning system includes comprising a processing system for detecting a high altitude ice crystal (HAIC) condition. The processing system uses at least two types of radar signals to detect the HAIC condition.

Another exemplary embodiment relates to a method of detecting a high altitude ice crystal (HAIC) condition on an aircraft using an electronic processor. The method includes receiving radar reflectivity data associated with a first type radar signal and a second type radar signal, and processing the radar reflectivity data to determine the HAIC condition exists by using the radar reflectivity data associated with the first type radar signal with the radar reflectivity data from the second type radar signal.

Another exemplary embodiment relates to an aircraft weather radar system. The aircraft weather radar system includes a radar antenna for receiving radar returns; and means for determining a high altitude ice crystal (HAIC) condition in response to at least two types of radar returns.

BRIEF DESCRIPTION OF THE DRAWINGS

Exemplary embodiments will become more fully understood from the following detailed description, taken in conjunction with the accompanying drawings, wherein like reference numerals refer to like elements, and.

DETAILED DESCRIPTION

Referring generally to the FIGURES, systems and methods for indicating a weather threat to an aircraft are described, according to an exemplary embodiment. An airborne weather radar system is generally configured to project radar beams and to receive radar returns relating to the projected radar beams. The projected radar beams generally pass through air and reflect off of precipitation (e.g., rain, snow, etc.), other aircraft, and terrain (e.g., a mountain, a building). Using the reflected return data, processing electronics associated with the weather radar system can distinguish between types of precipitation and terrain. Weather radar systems are typically configured to display the precipitation as measured weather threats in green (light rain or precipitation), yellow (moderate rain or precipitation), and red (severe rain or precipitation). While this "rain gauge" provides valuable information to the crew, more specific indicators of weather threats to the aircraft is helpful to the crew. For example, high altitude associated threat (HAAT) and/or high altitude ice crystal (HAIC) or HAIC cloud (HAIC$^2$) threat warnings advantageously allow pilots to avoid regions detrimental to aircraft and their engines. In one embodiment, the HAIC threat can be a high altitude ice crystal cloud (HAIC$^2$) threat.

Figure 1:
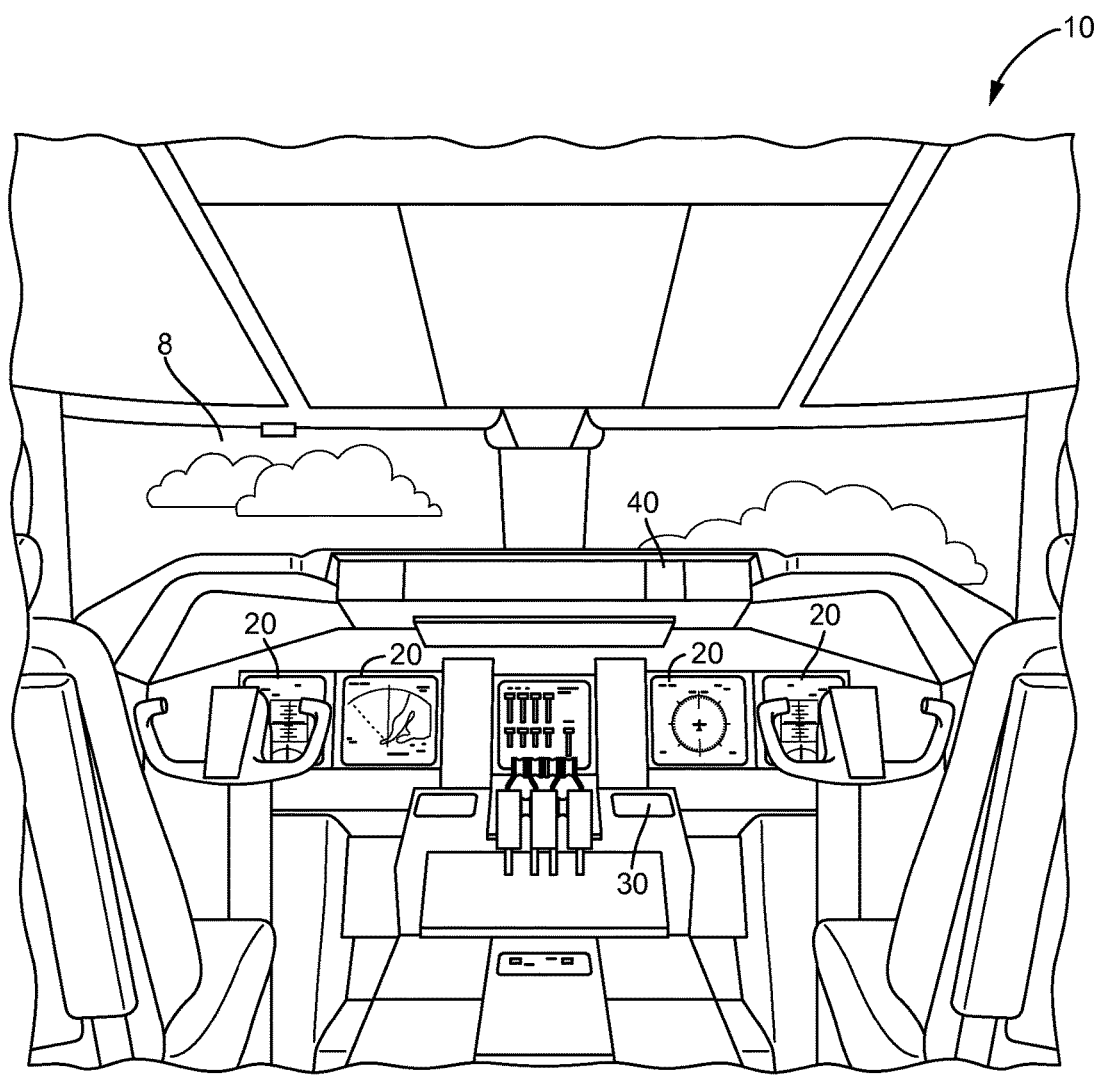
FIG. 1 is a perspective view schematic illustration of an aircraft control center, according to an exemplary embodiment.

Referring now to FIG. 1, an illustration of an aircraft control center or cockpit 10 is shown, according to an exemplary embodiment. Aircraft control center 10 includes flight displays 20 which are generally used to increase visual range and to enhance decision-making abilities. In an exemplary embodiment, flight displays 20 may provide an output from a radar system of the aircraft. For example, flight displays 20 may provide a top-down view, a horizontal view, vertical view/perspective or 3 dimensional view, or any other view of weather and/or terrain detected by a radar system on the aircraft. The views of weather may include monochrome or color graphical representations of the weather. Graphical representations of weather may include an indication of altitude of those objects or the altitude relative to the aircraft. Aircraft control center 10 may further include other user interface elements such as an audio device 30 (e.g., speaker, electro-acoustic transducer, etc.) and illuminating or flashing lamps 40. Weather can be displayed as colored regions on the aircraft according to ARINC standards.

In one embodiment, a HAIC, HAIC$^2$ and/or HAAT warning can be provided on any of displays 20 as part of a weather radar display. In one embodiment, the HAAT warning is displayed as a red speckled region, and the HAIC or HAIC$^2$ warning is displayed as a yellow speckled region. The red speckled region indicates a higher severity of threat for the HAAT warning as compared to the yellow speckled region for the HAIC or HAIC$^2$ warning.

Figure 2:
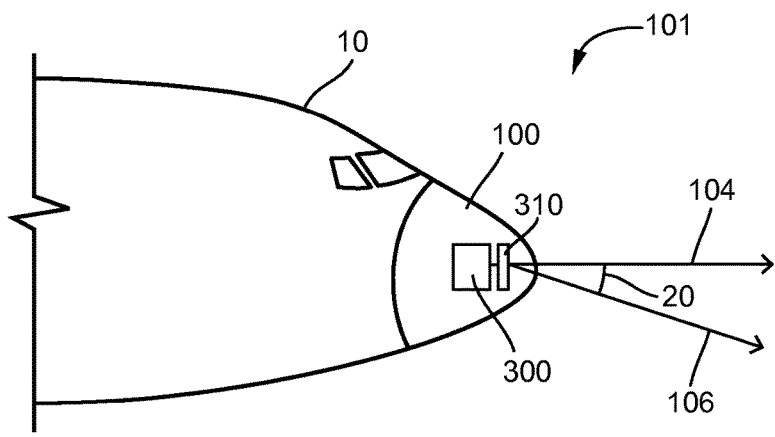
FIG. 2 is a side view schematic illustration of the nose of an aircraft including a weather radar system, according to an exemplary embodiment.

Referring to FIG. 2, the front of an aircraft 101 is shown with aircraft control center 10 and nose 100, according to an exemplary embodiment. A radar system 300 (e.g., a weather radar system or other radar system) is generally located within nose 100 of aircraft 101 or within aircraft control center 10 of aircraft 101. According to various exemplary embodiments, radar system 300 may be located on the top of aircraft 101 or on the tail of aircraft 101 instead. Radar system 300 may include or be coupled to an antenna system. A variety of different antennas or radar systems may be used as part of system 300 (e.g., a split aperture antenna, a monopulse antenna, a sequential lobbing antenna, etc.). In certain embodiments, antenna 310 is a dual, or more than dual frequency antenna or a dual or more than dual polarization antenna.

Radar system 300 generally works by sweeping a radar beam horizontally back and forth across the sky. Some radar systems will conduct a first horizontal sweep 104 directly in front of aircraft 101 and a second horizontal sweep 106 downward at some tilt angle 108 (e.g., 20 degrees down). Returns from different tilt angles can be electronically merged to form a composite image for display on an electronic display 20 shown, for example, in FIG. 1. Returns can also be processed to, for example, distinguish between terrain and weather, to determine the height of terrain, or to determine the height of weather. Radar system 300 can be a WXR-2100 MultiScan™ radar system or similar system manufactured by Rockwell Collins and configured as described herein. According to other embodiments, radar system 300 may be an RDR-4000 system or similar system manufactured by Honeywell International, Inc. configured as described herein. Radar system 300 may be integrated with other avionic equipment and user interface elements in aircraft control center 10 (e.g., flashing lights 40, displays 20, display elements on a weather radar display, display elements on a terrain display, audio alerting devices 30, navigation systems, TAWs equipment, etc.).

Figure 3:
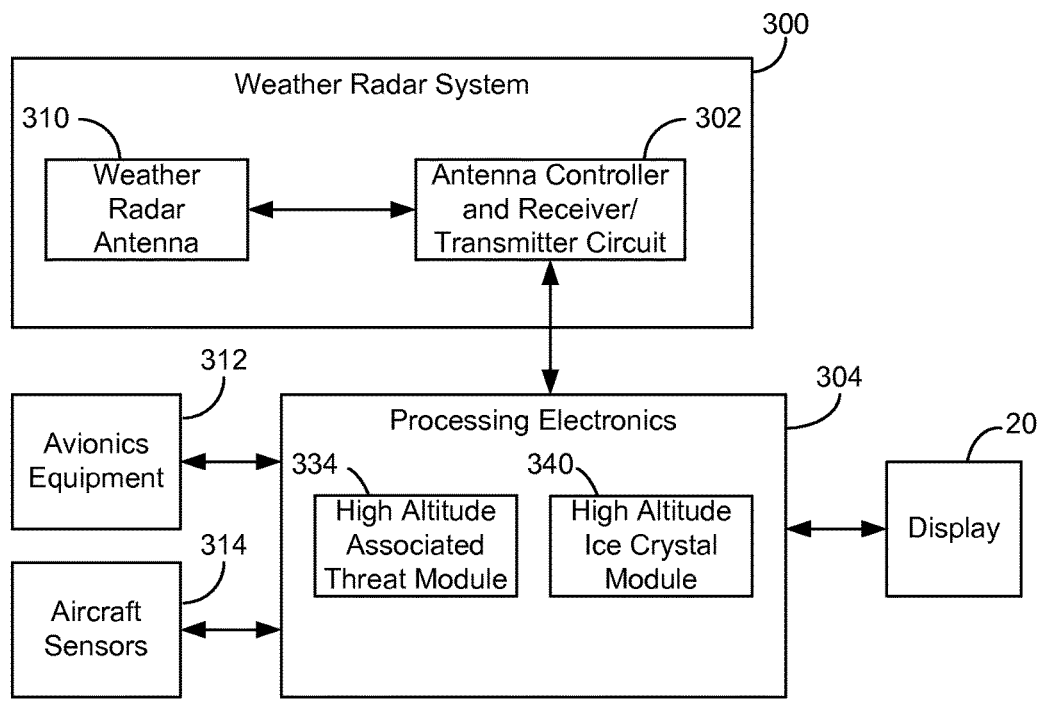
FIG. 3 is a block diagram of a weather radar system including a high altitude ice crystal (HAIC) or HAIC clouds (HAIC$^2$) module, according to an exemplary embodiment.

Referring to FIG. 3, a block diagram of radar system 300 embodied as a weather radar system is shown, according to an exemplary embodiment. Weather radar system 300 is shown to include a weather radar antenna 310 connected (e.g., directly, indirectly) to an antenna controller and receiver/transmitter circuit 302. Antenna controller and receiver/transmitter circuit 302 may include any number of mechanical or electrical circuitry components or modules for steering a radar beam. For example, circuit 302 may be configured to mechanically tilt the antenna in a first direction while mechanically rotating the antenna in a second direction. In other embodiments, a radar beam may be electronically swept along a first axis and mechanically swept along a second axis. In yet other embodiments, the radar beam may be entirely electronically steered (e.g., by electronically adjusting the phase of signals provided from adjacent antenna apertures, etc.). Circuit 302 may be configured to conduct the actual signal generation that results in a radar beam being provided from weather radar antenna 310 and to conduct the reception of returns received at radar antenna 310. Radar return data is provided from circuit 302 to processing electronics 304 for processing. For example, processing electronics 304 can be configured to interpret the returns for display on display 20.

Processing electronics 304 can also be configured to provide control signals or control logic to circuit 302. For example, depending on pilot or situational inputs, processing electronics 304 may be configured to cause circuit 302 to change behavior or radar beam patterns. In other words, processing electronics 304 may include the processing logic for operating weather radar system 300. It should be noted that processing electronics 304 may be integrated into radar system 300 or located remotely from radar system 300, for example, in aircraft control center 10.

Processing electronics 304 are further shown as connected to aircraft sensors 314 which may generally include any number of sensors configured to provide data to processing electronics 304. For example, sensors 314 could include temperature sensors, humidity sensors, infrared sensors, altitude sensors, a gyroscope, a global positioning system (GPS), or any other aircraft-mounted sensors that may be used to provide data to processing electronics 304. It should be appreciated that sensors 314 (or any other component shown connected to processing electronics 304) may be indirectly or directly connected to processing electronics 304. Processing electronics 304 are further shown as connected to avionics equipment 312 and include a high altitude ice crystal (HAIC) or HAIC cloud ($HAIC^2$) module 340 and a high altitude associated threat (HAAT) module 334. Modules 340 and 334 advantageously detect and locate HAIC, $HAIC^2$ and HAAT conditions and cause display 20 to provide a visual and/or audio warning of such conditions. Modules 334 and 340 process data associated with weather radar reflectivity levels and/or data from other sensors (e.g., temperature, altitude, etc.) to determine HAIC, $HAIC^2$ and HAAT conditions. Avionics equipment 312 can be or include a flight management system, a navigation system, a backup navigation system, or another aircraft system configured to provide inputs to processing electronics 304. The HAIC or $HAIC^2$ condition can be sensed via a dual frequency or dual polarization process as explained below according to various exemplary embodiments.

Figure 4:
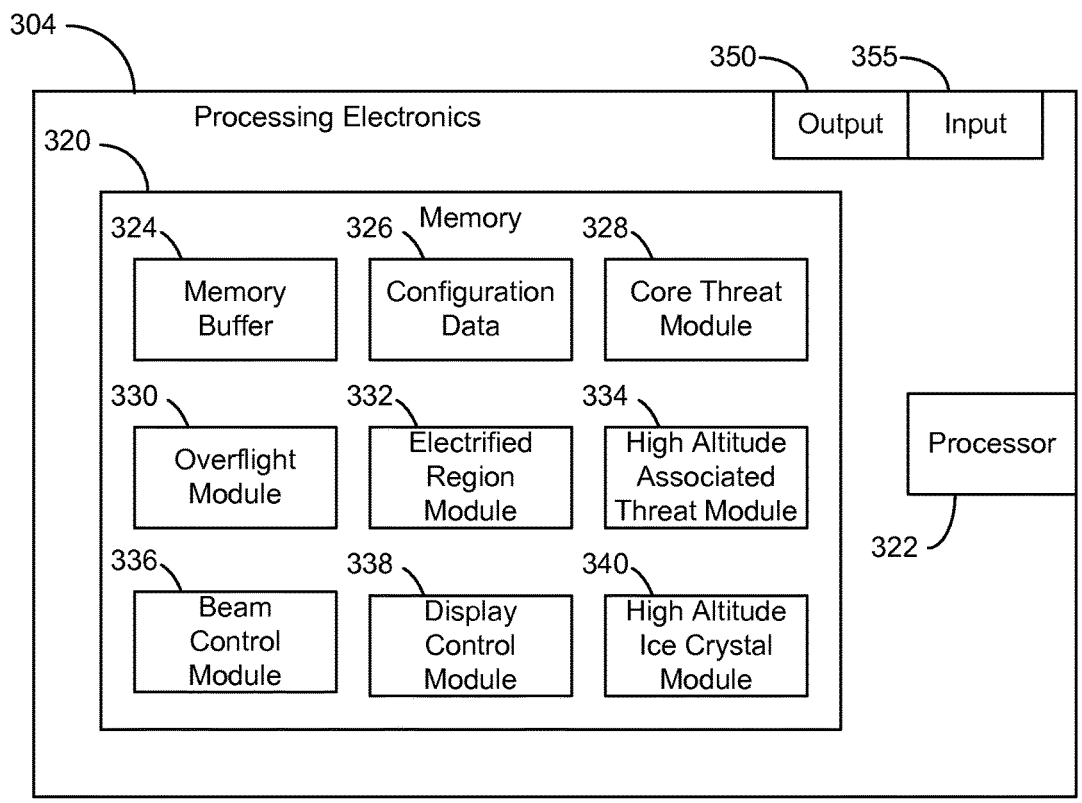
FIG. 4 is a more detailed block diagram of the weather radar system illustrated in FIG. 3 according to another exemplary embodiment.

Referring to FIG. 4, a detailed block diagram of processing electronics 304 of FIG. 3 is shown, according to an exemplary embodiment. Processing electronics 304 includes a memory 320 and processor 322. Processor 322 may be or include one or more microprocessors, an application specific integrated circuit (ASIC), a circuit containing one or more processing components, a group of distributed processing components, circuitry for supporting a microprocessor, or other hardware configured for processing. According to an exemplary embodiment, processor 322 is configured to execute computer code stored in memory 320 to complete and facilitate the activities described herein. Memory 320 can be any volatile or non-volatile memory device capable of storing data or computer code relating to the activities described herein. For example, memory 320 is shown to include modules 328-340 which are computer code modules (e.g., executable code, object code, source code, script code, machine code, etc.) configured for execution by processor 322. When executed by processor 322, processing electronics 304 is configured to complete the activities described herein. Processing electronics 304 includes hardware circuitry for supporting the execution of the computer code of modules 328-340. For example, processing electronics 304 includes hardware interfaces (e.g., output 350) for communicating control signals (e.g., analog, digital) from processing electronics 304 to circuit 302 or to display 20. Processing electronics 304 may also include an input 355 for receiving, for example, radar return data from circuit 302, feedback signals from circuit 302 or for receiving data or signals from other systems or devices.

Memory 320 includes a memory buffer 324 for receiving radar return data. The radar return data may be stored in memory buffer 324 until buffer 324 is accessed for data. For example, a core threat module 328, overflight module 330, electrified region module 332, HAAT module 334, display control module 338, HAIC or $HAIC^2$ module 340 or another process that utilizes radar return data may access buffer 324. The radar return data stored in memory 320 may be stored according to a variety of schemes or formats. For example, the radar return data may be stored in an x,y or x,y,z format, a heading-up format, a north-up format, a latitude-longitude format, a radial format, or any other suitable format for storing spatial-relative information.

Memory 320 further includes configuration data 326. Configuration data 326 includes data relating to weather radar system 300. For example, configuration data 326 may include beam pattern data which may be data that a beam control module 336 can interpret to determine how to command circuit 302 to sweep a radar beam. For example, configuration data 326 may include information regarding maximum and minimum azimuth angles of horizontal radar beam sweeps, azimuth angles at which to conduct vertical radar beam sweeps, timing information, speed of movement information, and the like. Configuration data 326 may also include data, such as threshold values, model information, look up tables, and the like used by modules 328-340 to identify and assess threats to aircraft 101.

Memory 320 is further shown to include a core threat module 328 which includes logic for using radar returns in memory buffer 324 to make one or more determinations or inferences relating to core threats to aircraft 101. For example, core threat module 328 may use temperature and radar return values at various altitudes to calculate a probability that lightning, hail, and/or strong vertical shearing exists within a weather cell. Core threat module 328 may be configured to compare the probability and/or severity of the core threat to a threshold value stored, for example, in core threat module 328 or configuration data 326. Core threat module 328 may further be configured to output a signal to display control module 338 indicative of the probability of the core threat, of the inferred threat level within the weather cell, or of the inferred threat level within the weather cell being greater than the measured threat due to radar returns from rainfall. The signal may further cause a change in a color on aviation display 20 associated to the threat level to aircraft 101.

Memory 320 is further shown to include an overflight module 330 which includes logic for using radar returns in memory buffer 324 to make one or more determinations or inferences based on weather below aircraft 101. For example, overflight module 330 may be configured to determine the growth rate of a weather cell and/or the change in altitude of an echo top of a weather cell over time. Overflight module 330 may further be configured to calculate a probability that a weather cell will grow into the flight path of aircraft 101. Overflight module 330 may be configured to output a signal to display control module 338 indicating the threat of the growing weather cell in relation to the flight path of aircraft 101. For example, the signal may indicate predicted intersection of the flight path of aircraft 101 and the weather cell, rate of growth of the weather cell, or predicted growth of the weather cell to within a threshold distance of the flight path of aircraft 101. For example, the signal may cause an icon to be displayed on aviation display 20 in a location corresponding to the growing cell, wherein the size of the icon may represent the size, amount, or probability of threat to the aircraft. Overflight module 330 may be configured to inhibit display of weather far below, and thus not a threat to, aircraft 101.

Memory 320 is further shown to include an electrified region module 332 which includes logic for using radar returns in memory buffer 324 to make one or more determinations or inferences regarding potentially electrified regions around the weather cell. For example, electrified region module 332 may be configured to use temperature and reflectivity to determine whether a region around a weather cell is likely to produce lightning. Electrified region module 332 may be configured to determine a probability of aircraft 101 producing a lightning strike if the aircraft flies through a particular region based on the reflectivity around a convective cell near the freezing layer. Electrified region module 332 may further be configured to cause a pattern to be displayed on aviation display 20. For example, electrified region module 332 may be configured to output a signal to display control module 338 indicating the existence, location, and/or severity of risk of the electrified region.

Memory 320 is further shown to include HAAT module 334 which includes logic for using radar returns (e.g., data) in memory buffer 324 to make one or more determinations or inferences regarding high altitude associated threats (e.g., threats related to a blow off or anvil region of a weather cell). HAAT conditions can be associated with high severity threat conditions such as hail, lightning, turbulence, etc. For example, HAAT module 334 may be configured to use wind speed, wind direction, and size of a weather cell to predict the presence of an anvil region downwind of a weather cell that may contain lightning, hail, and/or turbulence. HAAT module 334 may be configured to cause a pattern (e.g., a red speckled region) to be displayed on an aviation display 20. For example, HAAT module 334 and module 338 can be configured to output a signal to display control module 338 indicating the existence, location, and severity or risk of the anvil region. HAAT module 334 can detect a HAAT condition based upon the presence of convective cells reaching high altitudes and having anvil shapes. Such conditions can be sensed using the techniques described in U.S. application Ser. Nos. 13/919,406 and 13/84,893. Ice crystals may be present in a HAAT region. A HAAT condition generally is a more significant threat than a HAIC or $HAIC^2$ condition.

Memory 320 is further shown to include HAIC or $HAIC^2$ module 340 which includes logic for using radar returns in memory buffer 324 to make one or more determinations or inferences regarding threats related to a HAIC or $HAIC^2$ condition. Module 340 can be combined with module 338, be a hard wired ASIC, or programmable logic circuit in one embodiment. HAIC module 340 and weather radar system 300 can be configured to use dual frequency or dual polarization processes to detect presence of the HAIC or $HAIC^2$ condition and its location in one embodiment. Dual frequency and dual polarization techniques advantageously allow for providing information on the nature of the scattering environment, thereby providing more accurate ice water content (IWC) estimates which aids discrimination of particle size and particle size distribution for HAIC detection. Alternatively, module 340 and weather radar system 300 can utilize an inferred or non-inferred process discussed in related U.S. patent application Ser. No. 14/206,239 incorporated herein by reference in one embodiment. In one embodiment, HAIC or $HAIC^2$ module receives data associated with weather returns at high altitude and processes the data to determine existence of a HAIC or $HAIC^2$ condition. The data can be processed by comparing the data representing returns of a first type (e.g., polarization or frequency) and returns of a second type (e.g., polarization or frequency) to known ice crystal return characteristics to determine a match and therefore a HAIC or $HAIC^2$ condition. In one embodiment module 340 senses only one of a HAIC or $HAIC^2$ condition.

Memory 320 is further shown to include a beam control module 336. Beam control module 336 may be an algorithm for commanding circuit 302 to sweep a radar beam. Beam control module 336 may be used, for example, to send one or more analog or digital control signals to circuit 302. The control signals may be, for example, an instruction to move the antenna mechanically, an instruction to conduct an electronic beam sweep (of a phased array or electronically scanned array antenna) in a certain way, (e.g., an instruction to move the radar beam to the left by five degrees, etc.). Beam control module 336 may be configured to control timing of the beam sweeps or movements relative to aircraft speed, flight path information, transmission or reception characteristics from weather radar system 300 or otherwise. Beam control module 336 may receive data from configuration data 326 for configuring the movement of the radar beam.

Memory 320 is further shown to include a display control module 338 which includes logic for displaying weather information on aviation display 20. For example, display control module 338 may be configured to display radar return information received from memory buffer 324 and to determine a gain level or other display setting for display of an inferred threat to aircraft 101 on a weather radar display. Display control module 338 may be configured to receive signals relating to threats to aircraft 101 from core threat module 328, overflight module 330, electrified region module 332, HAAT module 334, and HAIC or $HAIC^2$ module 340. Display control module 338 may further be configured to cause, in response to one or more signals received from threat modules 328-334 and 340 and threshold values from configuration data 326, a change in color of a portion of an image on aviation display 20, a pattern (e.g., a speckled region) to be overlaid on an image on aviation display 20, and an icon to be shown on aviation display 20. Display control module 338 may be configured to cause a change in size, location, shape, or color of the colored regions, patterns, symbols, and/or icons in response to updated signals received from modules 328-336 and 340.

Processing electronics 304 may be configured to use none, some, or all of the threat modules 328-334 and 340 described above. For example, processing electronics 304 may have an automatic mode, in which weather radar antenna 310 is automatically controlled (e.g., direction, gain, etc.) and core threat module 328, overflight module 330, electrified region module 332, HAAT module 334 and HAIC or HAIC$^2$ module 340 are all processing information looking for inferred threats. Processing electronics 304 can have a manual mode, in which one or more of core threat module 328, overflight module 330, electrified region module 332, HAAT module 334 and HAIC or HAIC$^2$ module 340 are disabled, for example, for diagnostic purposes.

Figure 5:
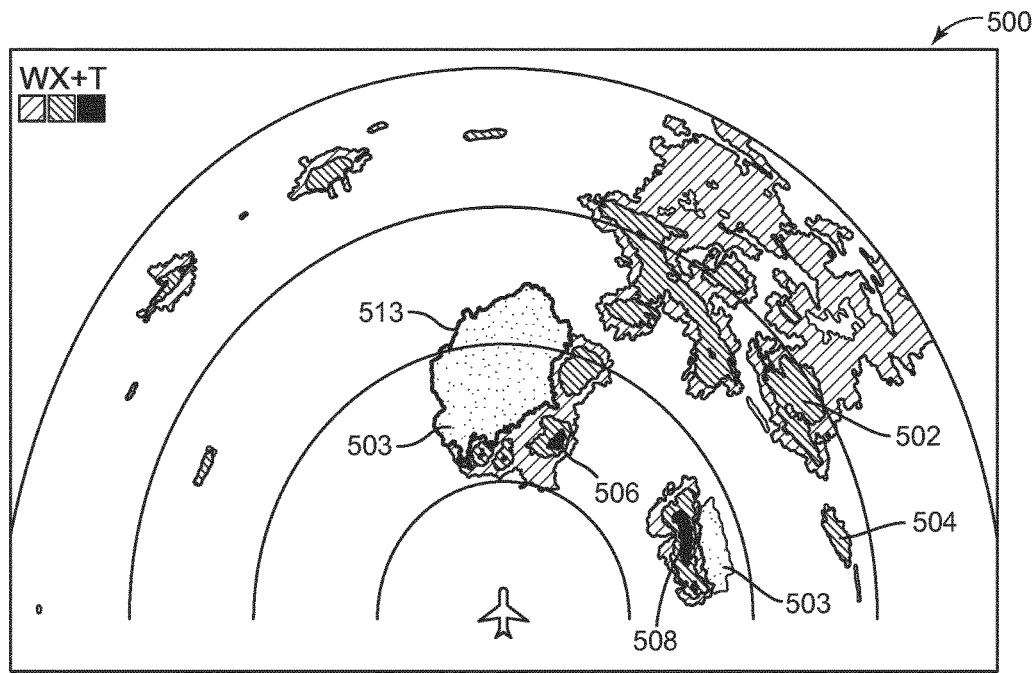
FIG. 5 is a schematic illustration of an aviation horizontal plan view weather display showing a HAIC or HAIC$^2$ warning, according to an exemplary embodiment.

Referring now to FIG. 5, a schematic illustration of aviation display 20 showing a weather radar display 500 including precipitative (or weather) regions 502, 504, 506 and 508 corresponding to radar returns according to an exemplary embodiment. Processing electronics 304 may be configured to cause aviation display 20 to show measured threats to aircraft 101 using symbology, icons, or text. In FIG. 5, light rain is shown as a slanted down left to right cross hatched area region, which is often indicated with a green color on display 20. A moderate rain is shown as a slanted down right to left cross hatched region in FIG. 5 often colored yellow on display 20 to indicate caution to the crew. Solid black regions in FIG. 5 correspond to heavy rain, and are usually colored red on display 20 to indicate warning to the crew. Region 502, 504, 506, and 508 can be shown in accordance with Federal Aviation Administration (FAA) standards.

HAIC or HAIC$^2$ module 340 and module 338 can be configured to cause a pattern (e.g., a yellow speckled region) to be displayed on an aviation display 20 to indicate a HAIC warning in one embodiment. HAIC or HAIC$^2$ module 340 is configured to output a signal or data to display control module 338 indicating the existence, location, and severity or risk of the HAIC or HAIC$^2$ condition or region in one embodiment. Module 338 can cause the appropriate video signal to be provided to display 20. An indication that the HAIC or HAIC$^2$ warning is based on dual frequency or dual polarization analysis as described below or on an inferred processing or non-inferred processing as described in U.S. patent application Ser. No. 14/206,239, incorporated herein by reference according to various embodiments. Module 340 and module 338 can operate to provide the displays described in U.S. patent application Ser. No. 14/207,034, incorporated herein by reference in one embodiment.

In one embodiment, areas tagged as potential for icing (a HAIC or HAIC$^2$ condition) could be enhanced in color to depict the threat (a green echo could be enhanced to amber) since these icing conditions have weaker reflectivity. Module 338 and configuration data 326 can be used to make the threshold adjustment and appropriately provide for the HAIC or HAIC$^2$ condition on display 20.

Figure 6:
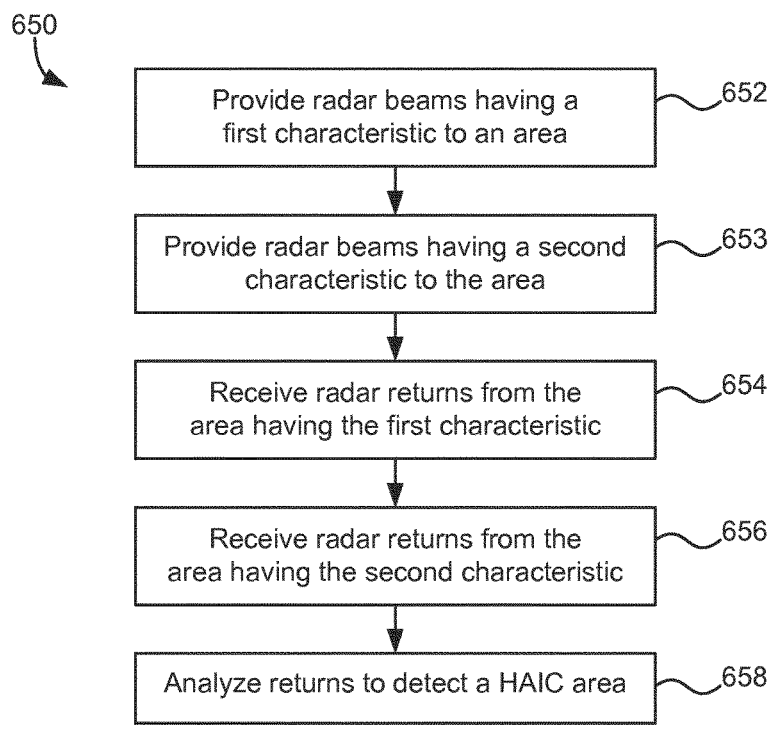
FIG. 6 is a flow diagram showing a process performed by the weather radar system illustrated in FIG. 3 for HAIC detection, according to an exemplary embodiment.

With reference to FIG. 6, processing electronics 304 and module 340 (FIG. 3) can operate according to a process 650 for detecting a HAIC or HAIC$^2$ condition. At a step 652, weather system 300 provides radar beams having a first characteristic to an area. The first characteristic can be a first frequency band (e.g., X band, W band, Ka band, etc.) or a first polarity type (e.g., horizontal, vertical, circular, etc.). At a step 653, system 300 provides radar beams having a second characteristic to the area. The second characteristic can be a second frequency different from the first frequency (e.g., X band, W band, Ka band, etc.), or a second polarity type different from the first polarity type (vertical, horizontal, circular, etc.). Steps 652 and 653 can be performed sequentially or simultaneously.

At a step 654, system 300 receives radar returns having the first characteristic from the area. In one embodiment, the radar returns are horizontally polarized returns from horizontally polarized beams ((HH) radar returns) or vertically polarized returns from vertically polarized beams ((VV) radar returns). At a step 656, weather radar system 300 receives radar returns having the second characteristic (e.g., VV or HH) from the area. In one embodiment, the second characteristic can be VV radar returns and the first characterized can be HH radar returns. In one embodiment, the first characteristic of the returns can be a first frequency band (e.g., X band) and the second characteristic of the returns can be a second frequency band (e.g., W, Ka, etc.) Steps 654 and 656 can be performed sequentially or simultaneously. At a step 658, the returns are analyzed to determine HAIC or HAIC$^2$ characteristics by determining particle sizes and shapes and comparing to known particle sizes and shapes for HAIC or HAIC$^2$ conditions in one embodiment. The returns can be compared to known returns for the different return characteristics for HAIC or HAIC$^2$ conditions.

Figure 7:
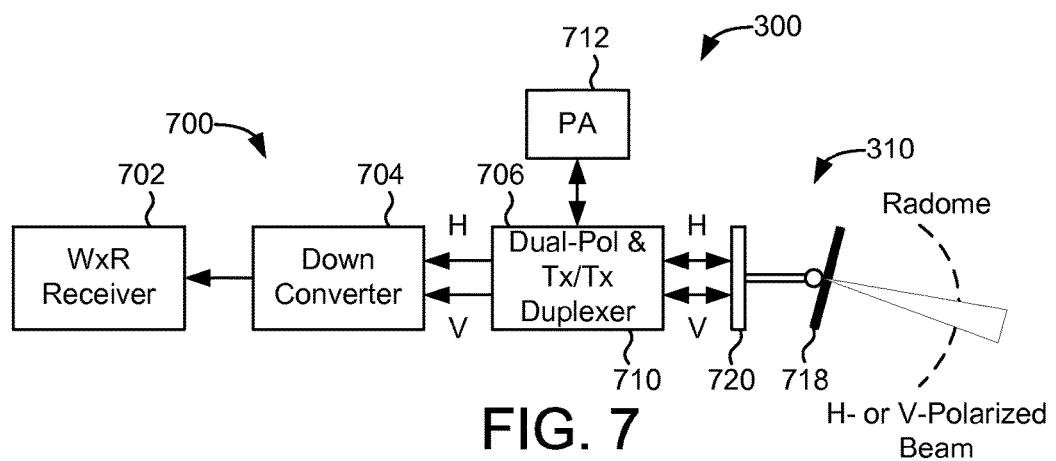
FIG. 7 is a more detailed block diagram of a sequential dual polarization architecture with a passive antenna for the weather radar system illustrated in FIG. 3 in accordance with another exemplary embodiment.

With reference to FIG. 7, weather radar system 300 can be configured to have an architecture 700 comprising a weather radar receiver (W×R) 702, a down converter 704, a dual polarization transmit/transmit duplexer 710, an interface 720, a passive antenna 718 and a power amplifier 712. Receiver 702, converter 704, power amplifier 712 and duplexer 710 can be part of circuit 302 (FIG. 3) or electronics 304. Power amplifier 712 operates to provide radar signals with a first polarization state and radar signals with a second polarization state sequentially. The radar signals are provided through duplexer 710 to antenna 718 for transmission. The frequency source may or may not be coherent for architecture 700.

Returns associated with the radar signals are received sequentially by antenna 718 and provided via interface 720 to duplexer 706. Duplexer 706 provides returns in a first polarization state to a first input of converter 704 and returns of a second polarization state at a second input of converter 704. The first polarization state can be horizontal (e.g., HH), and the second polarization state can be vertical (e.g., VV) in one embodiment. The returns received by down converter 704 are down converted and provided to receiver 702 and to input 355 of electronics 304 (FIG. 4) for processing. Electronics 304 and module 340 can process data associated with the radar returns to provide analysis for an HAIC or HAIC$^2$ condition.

Architecture 700 advantageously only requires a single power amplifier 712 for providing power to both polarizations in one embodiment. Time multiplexing for both polarizations can degrade other radar scanning missions and can slow down HAIC and/or HAIC$^2$ detection and discrimination in certain embodiments.

Figure 8:
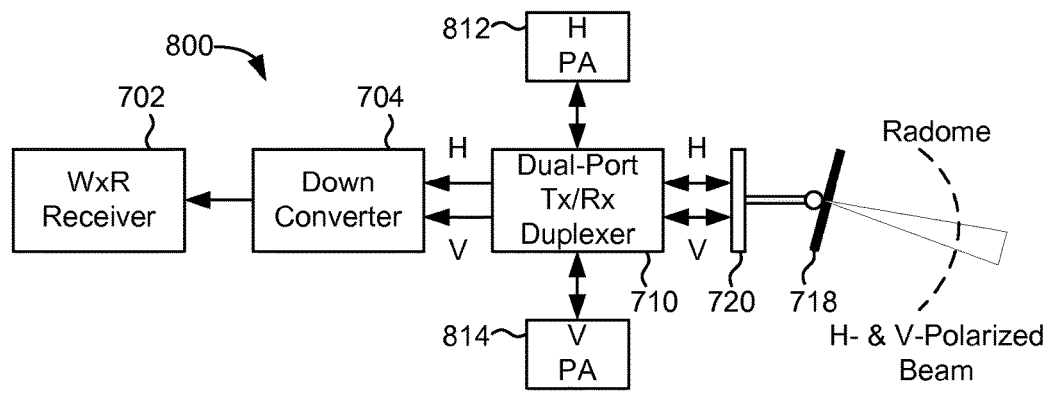
FIG. 8 is a more detailed block diagram of a simultaneous dual polarization architecture with a passive antenna for the weather radar system illustrated in FIG. 3 in accordance with yet another embodiment.

With reference to FIG. 8, an architecture 800 includes W×R receiver 702, down converter 704, a dual port transmit/receive duplexer 810, interface 720, a first type polarization power amplifier 812, a second type polarization amplifier 814, and passive antenna 718. Architecture 800 can simultaneously provide dual polarization radar signals (e.g., horizontal and vertical polarization signals) through duplexer 812 to antenna 718 to provide a radar beam with horizontal and vertical polarized energy. The polarizations can be dual orthogonal polarization in one embodiment. Returns are received by antenna 718 and returns of a first polarization type (e.g., HH) and a second polarization type (e.g., VV) are provided through down converter 704 to receiver 702 for processing.

Architecture 800 provides polarization agility and can utilize horizontal, vertical, linear polarization, circular polarization, elliptical polarization, horizontal transmit, horizontal/vertical receive/transmit and vice versa to provide additional information on particle shapes and sizes and ice water content for more accurate discrimination and fewer false alarms in one embodiment. Architecture 800 requires at least one additional power amplifier and associated connections in one embodiment.

Figure 9:
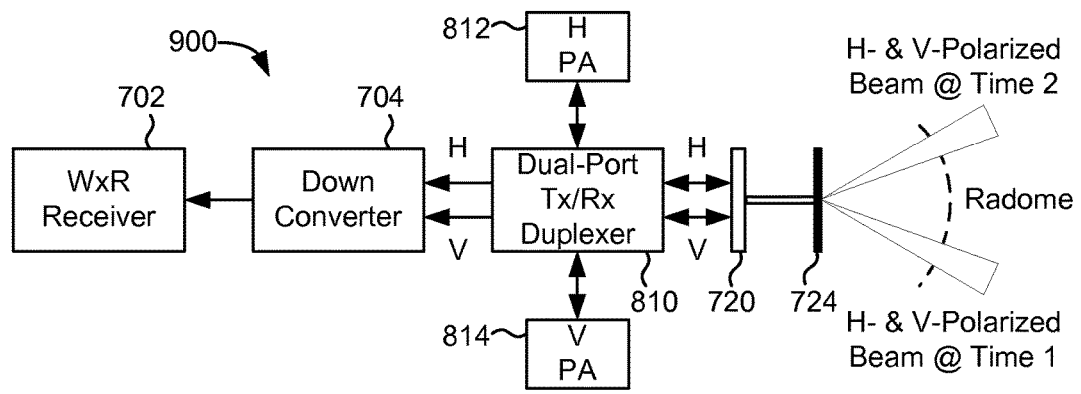
FIG. 9 is more detailed schematic block diagram of a simultaneous dual polarization architecture with an active antenna for the weather radar system illustrated in FIG. 3 in accordance with another exemplary embodiment.

With reference to FIG. 9, an architecture 900 includes W×R receiver 702, down converter 704, interface 720, duplexer 810, power amplifier 812, power amplifier 814, duplexer 810 and antenna 724. Antenna 724 is an active antenna in one embodiment. Radar signals of two polarization types can be simultaneously provided by amplifiers 812 and 814 through duplexer 810 to antenna 724. Antenna 724 can provide a dual polarization beam at a first time and a dual polarization time at a second time. Returns can be received through duplexer 810 and down converter 704 by W×R receiver 702 for processing for HAIC and HAIC$^2$ condition detection. Architecture 900 advantageously allow regions of potential HAIC or HAIC$^2$ conditions to be revisited almost instantaneously for verification and additional HAIC discrimination measurements.

Figures 10, 11:
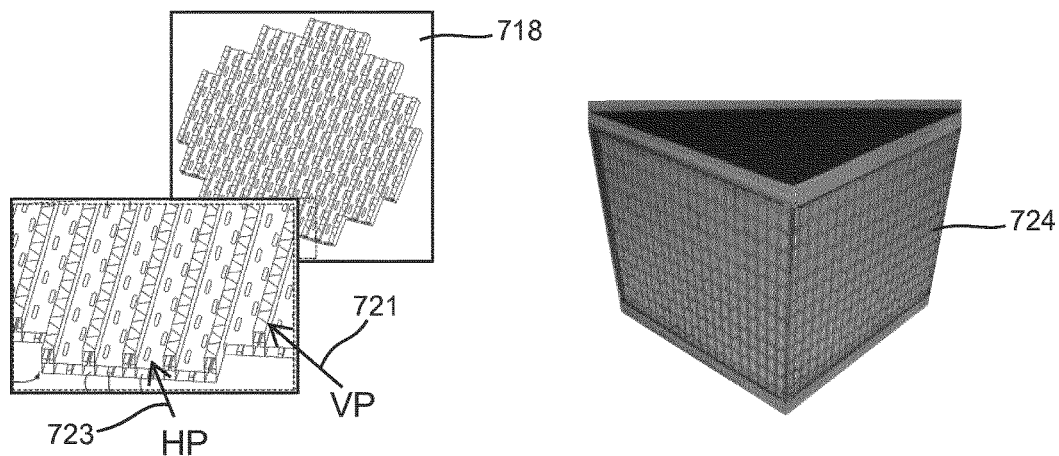
FIG. 10 is a schematic perspective view illustration of a passive dual polarization antenna illustrated in FIGS. 7 and 8 in accordance with another embodiment.
FIG. 11 is a perspective view schematic illustration of an active dual polarization antenna for the architecture illustrated in FIG. 9 in accordance with another exemplary embodiment.

With reference to FIG. 10, antenna 718 can be provided as a passive antenna with interspersed horizontal broad wall and vertical edge wall waveguide slots. Slots 723 can be used for horizontal polarization and slots 721 can be provided for vertical polarization in one embodiment. Antenna 718 can provide simultaneous dual channel returns or sequential single channel returns.

With reference to FIG. 11, antenna 724 is an active antenna and includes dual polarization elements. Antenna 724 can have simultaneous dual channels or a sequential single channel. Antenna 724 can be either mechanically or electronically scanned in either one or two dimensions in one embodiment.

Figure 12:
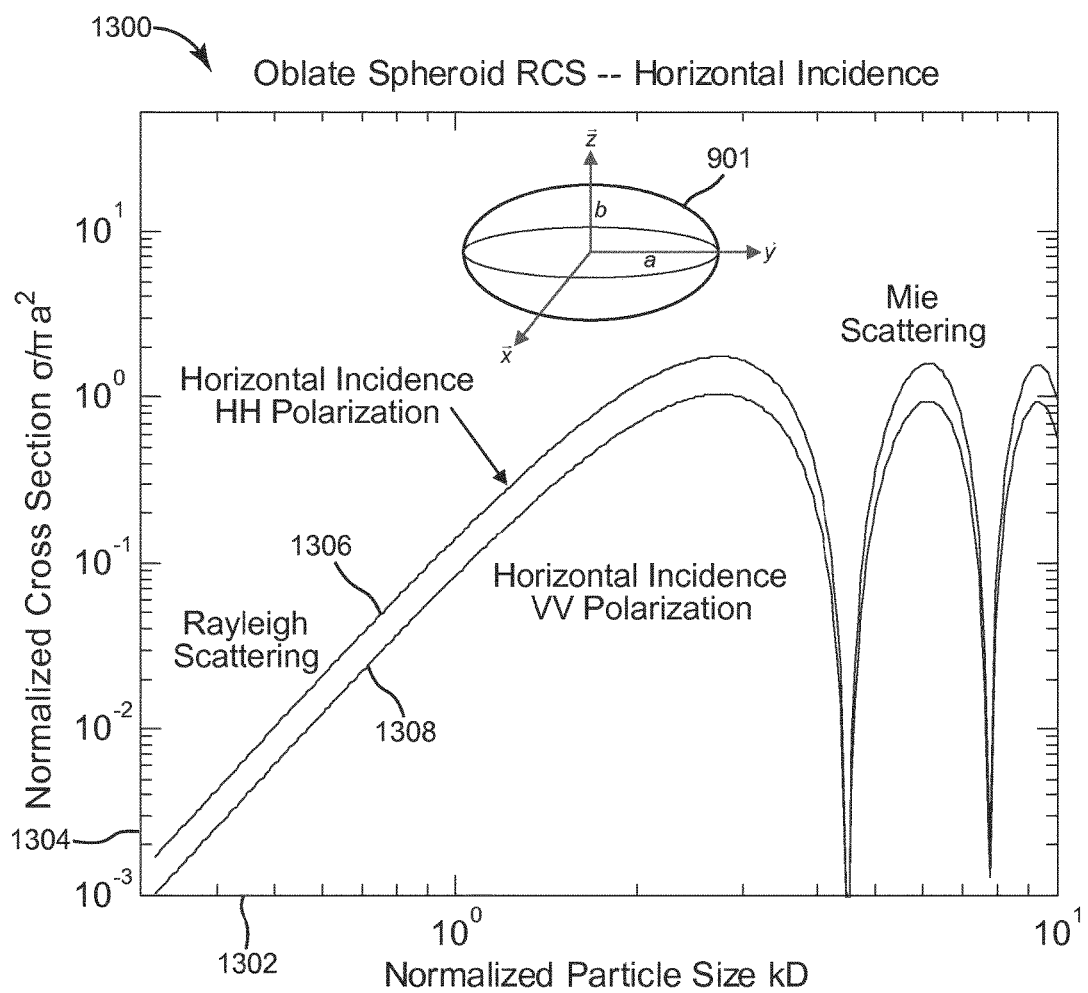
FIG. 12 is a chart showing normalized radar cross section for oblate spheroids (horizontal incidence) versus normalized particle size.

With reference to FIG. 12, chart 1300 shows normalized radar cross section (RCS)

$$\left(\frac{\sigma}{\pi a^2}\right)$$

for an oblate spheroid having a dimension a in the X and Y directions and dimension b in the Z direction (See diagram 901). An X axis 1302 of chart 1300 provides normalized particle size in kD, where $$k = \frac{2\pi}{\lambda}$$

and D=2a. λ is me wave length of the radar beam. A Y axis 1304 represents normalized radar cross section (RCS)

$$\left(\frac{\sigma}{\pi a^2}\right).$$

Generally, particles in a HAIC condition have various sizes and shape. For non-spherical particles, the radar cross section (RCS) depends on polarization. H polarization has an e-vector in the X-Y plane, and vertical polarization has an e-vector in the Z direction. Accordingly, polarization makes a difference in particle radar cross section. Chart 1300 assumes a particle shape having α=0.6, where α=b/a.

A curve 1306 and a curve 1308 demonstrate RCS differences due to polarization. The RCS differences can be utilized to discriminate particle shapes.

Figure 13:
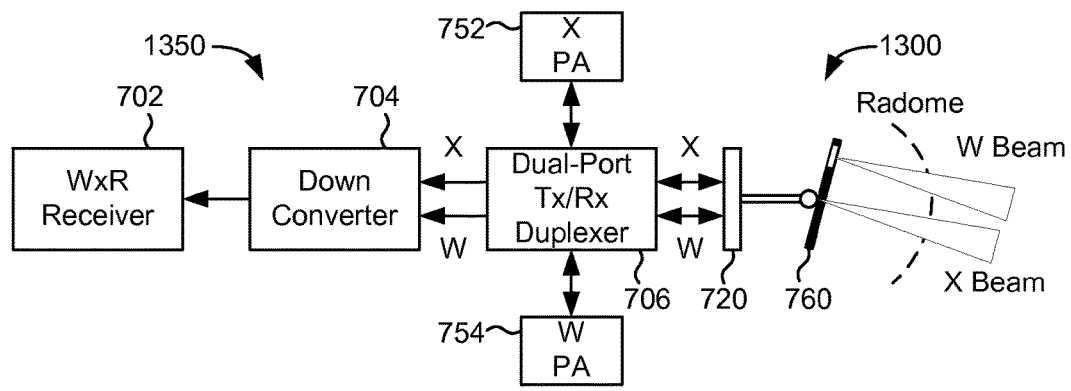
FIG. 13 is a more detailed schematic block diagram of a simultaneous dual frequency architecture with a passive antenna for the weather radar system illustrated in FIG. 3 in accordance with another exemplary embodiment.

With reference to FIG. 13, an architecture 1350 includes weather radar receiver 702, down converter 704, dual port transmit/receiver duplexer 706 an interface 720, an X band power amplifier 752 and a W Band power amplifier 754 in one embodiment. X Band radar signals and W Band radar signals can be provided through duplexer 702 to a dual frequency antenna 760 in one embodiment. Antenna 760 can be a passive antenna in one embodiment.

Returns associated with the W beam and the X beam can be received through duplexer 706, down converter 704 by receiver 702 for processing for detection of HAIC or HAIC$^2$ conditions. Alternatively, frequency bands can be utilized. Power amplifiers at higher frequencies are generally less efficient (e.g., 25% at X and 20% at $K_a$ and 10% at W) in certain embodiments and noise figures can increase with frequency (e.g., 3 dB at X, 4 dB at $K_a$ and 5 dB at W band).

Frequency diversity provides additional information on particle sizes and ice water content for more accurate discrimination and fewer false alarms in one embodiment. In addition, if W band is utilized with the same beamwidths as the X-band antenna, the new aperture is $1/100^{th}$ of the area of the X band antenna, and the W band antenna can fit on the X band aperture without degradation of the X band signal in one embodiment. In addition, the W band portion of the antenna can use the same gimbal in one embodiment. Alternatively, other frequency bands besides X and W can be utilized including $K_a$ bands, etc.

Figure 14:
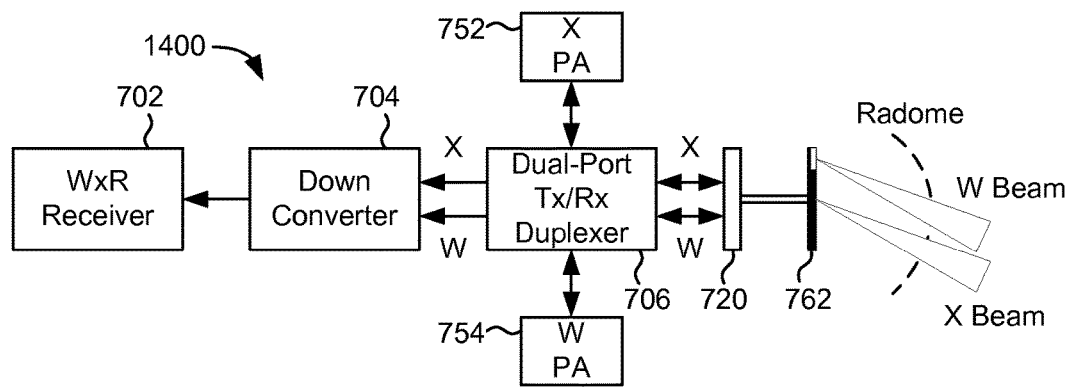
FIG. 14 is a more detailed schematic block diagram of a simultaneous dual frequency architecture with an active antenna for the weather radar system illustrated in FIG. 3 in accordance with another exemplary embodiment.

With reference to FIG. 14, an architecture 1400 includes weather radar receiver 702, down converter 704, dual port transmit/receive duplexer 706, power amplifier 752, interface 720 power amplifier 754 and an active antenna 762. X band and W band radar signals are provided through duplexer 706 to antenna 762 in one embodiment. Radar returns from the X band and W band radar signals are received through duplexer 706 and down converter 704. Receiver 702 receives the returns for processing to detect HAIC conditions.

Architecture 1400 advantageously provides little or no degradation to current weather radar missions in one embodiment. Architecture 1400 provides the advantage to revisit almost instantaneously regions of potential HAIC$^2$ for verification and additional measurements in one embodiment.

Figures 15, 16:
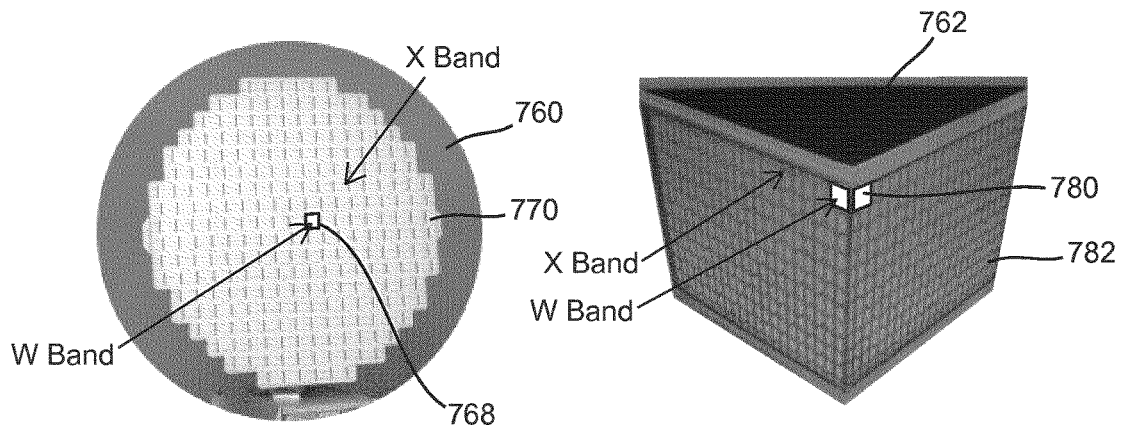
FIG. 15 is a planar view schematic illustration of a passive dual frequency antenna for the architecture illustrated in FIG. 13 in accordance with another exemplary embodiment.
FIG. 16 is a perspective view schematic drawing of a dual frequency active antenna for the architecture illustrated in FIG. 14 in accordance with another exemplary embodiment.

With reference to FIG. 15, antenna 760 includes a W band aperture 768 ($1/10^{th} \times 1/10^{th}$) antenna at the center of the X band aperture 770. Ka-band elements can also be interlaced with X band elements for Ka band isolation. Antenna 760 can be provided as the same size as an X band antenna with less than twice the weight and less than twice the cost in one embodiment. However, power required for antenna 706 can be increased by more than 2 times in one embodiment.

With reference to FIG. 16, antenna 762 is an active antenna including an antenna 780 inserted at the center corner of a lower frequency (e.g., X band) antenna 782. The relationship between sizes of the high frequency antenna to the lower frequency antenna is $$\text{Aperture Size Scale Factor} = \left[\frac{\lambda_{high\,freq\,band}}{\lambda_{low\,freq\,band}}\right]^2$$

The higher frequency antenna can conceptually be placed anywhere within the lower frequency (e.g., X Band) AESA (Active Electronically Scanned Array) antenna. Additionally, multiple (e.g. W Band) antenna can be integrated into the lower frequency (X Band) AESA panels as system needs dictate, e.g. an, increase higher frequency sensitivity, or multiple higher frequency antennas can have polarization diversity, along with frequency diversity. The specific example herein is X/W B according to one embodiment and, however, other widely separated frequency band combinations may be used in other embodiments. A W Band antenna can be placed anywhere within the X Band AESA (Active Electronically Scanned Array) antenna in one embodiment. Additionally, a multiple W Band antenna can be integrated into two X Band AESA panels. Multiple band (W, X, etc.) antennas can have polarization diversity, along with X/W Band frequency diversity in some embodiments. The power is increased by greater than 2 times and the cost is increased by 2 times. Generally, current weather radar radomes are not wideband transmissive, and antenna 762 can compensate for randome distortion at high frequency.

Figure 17:
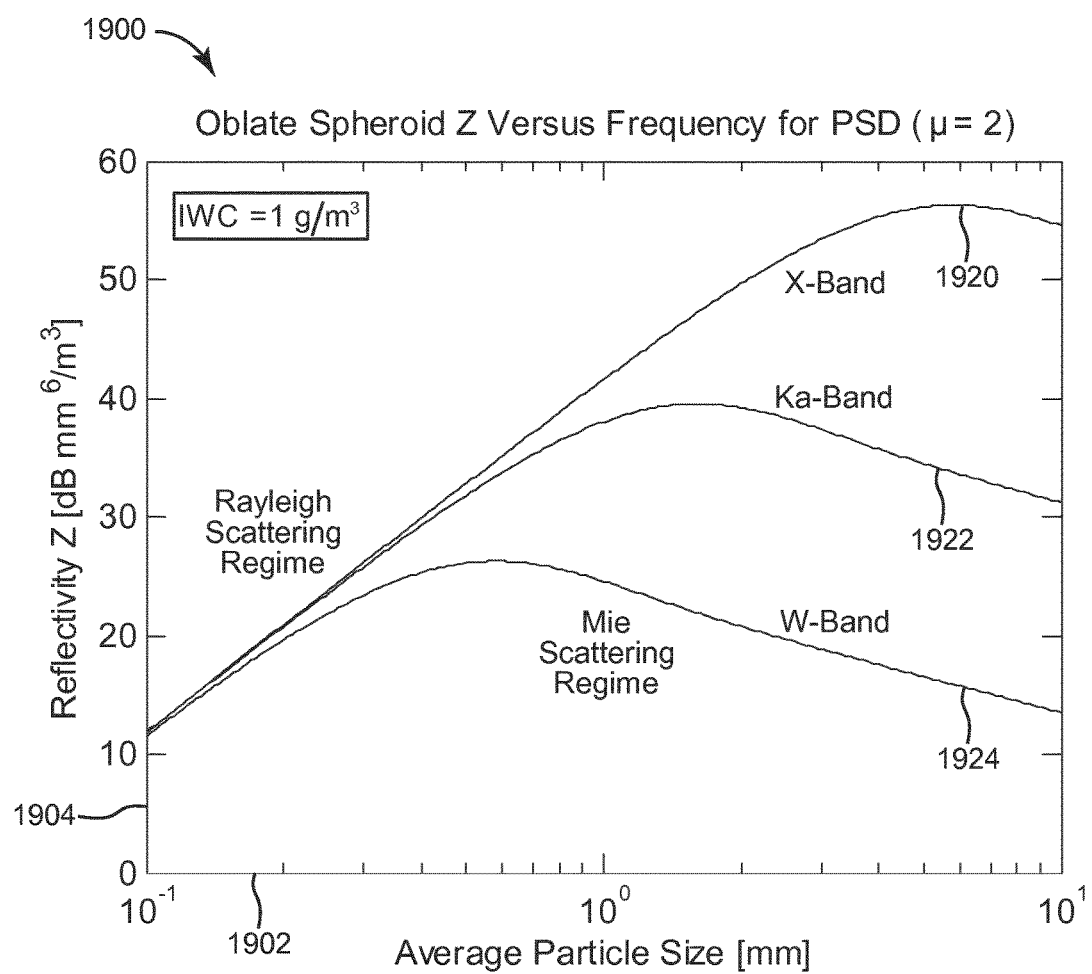
FIG. 17 is a chart showing reflectivity for a random particle size cloud (oblate spheroid Z) versus average particular size for the weather radar system illustrated in FIG. 3 in accordance with another exemplary embodiment.

With reference to FIG. 17, a chart 1900 of frequency diversity effect on particle reflectivity includes a Y axis 1904 representing reflectivity (Z, dB mm$^6$/mm$^3$), and an X axis 1902 representing average particle size in millimeters. Chart 1900 provides oblate spheroid reflectivity versus frequency for the gamma particle size distributions with $\mu$=2. Chart 1900 assumes ice water content of one gram per meter cubed and a random particle size cloud.

A curve 1920 shows an X band response, a curve 1922 shows a Ka band response and a curve 1924 shows a W band response. Due to differences in scattering regimes such as Rayleigh and Mie scattering, particles have different radar reflectivities at different wavelengths as shown by curves 1920, 1922 and 1924. Comparison of reflectivity for two or more frequencies provides information on average particle size.

Figure 18:
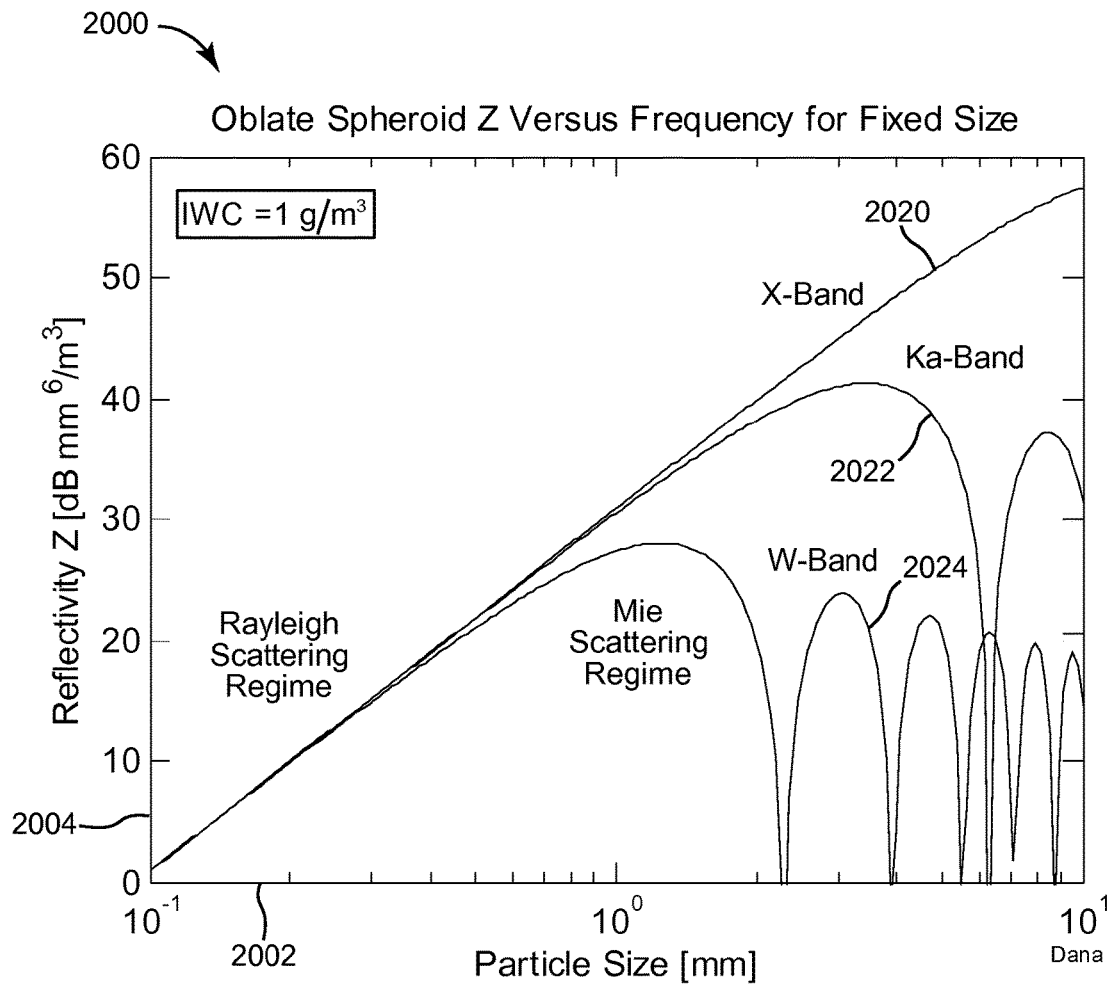
FIG. 18 is a chart showing reflectivity for a fixed particle size cloud (oblate spheroid Z) versus particular size for the weather radar system illustrated in FIG. 3 in accordance with another exemplary embodiment.

With reference to FIG. 18, a chart 2000 shows oblate spheroid reflectivity versus frequency for a fixed particle size cloud. The ice water content is assumed to be one gram per meter cubed. An X axis 2002 represents particle size in mm, and a Y axis 2004 represents reflectivity (Z dB mm$^6$/mm$^3$). Curve 2020 is associated with an X band radar signal, curve 2022 is associated with a Ka band, and curve 2024 is associated with a W band. As can be seen in chart 2000, transition from Rayleigh and Mie scattering depends on frequencies and particle shape to a minor extent. Comparison of reflectivity for two or more frequencies provides information on the particle size in a fixed particle size cloud.

System 300 can utilize data associated with charts 1300, 1900 and 2000 to determine particle size and shape. The identification of particle size and shape can be used to discriminate ice particles from non-ice particles. Accordingly, by comparing radar returns associated with two or more signal characteristics, system 300 can determine information about particles for discrimination of those particles being ice (being an HAIC and HAIC$^2$ condition) or non-ice according to one embodiment. For example, dual polarization or dual frequency can allow discrimination between ice and super cooled water at high altitudes.

In one embodiment, returns can be compared to historical return characteristics at varying polarizations and frequencies to determine a match. The historical returns can be provided on a location by location or geographic type basis (e.g., continental, maritime, etc.). In one embodiment, ice particles in globe-like sphere form have a long dimension that is aligned in accordance with aerodynamic forces and/or electric fields associated with weather cells. Generally, a larger variation between horizontal and vertical polarization can mean a higher probability of ice presence. By comparing returns in horizontal or vertical polarizations, asymmetric particles can be distinguished from non-asymmetric particles or clouds containing asymmetrical particles can be distinguished from clouds not containing asymmetric particles.

Generally, larger particle sizes indicate a presence of ice as super cooled water tends to be small and spherical. Accordingly, the dual frequency technique provides information about size of particles for determination of a HAIC$^2$ and HAIC condition. In one embodiment, the frequency difference between the two bands is large to provide better distinction between returns and particle sizes.

Although amplifiers 712, 812, 814, 752 and 754 are shown as a standalone module in FIGS. 7, 8, 9, 13, and 14, W×R receiver 702 can be an X Band or C Band weather radar receiver that is coherent to either the dual band or dual polarization in certain embodiments. The Tx and Rx chains can be derived from a common frequency source that is up-converted to the X Band Tx drive signal and the X Band Rx local oscillators to maintain coherency. An up converter tied to receiver 702 can be included in certain embodiments.

Although architectures 700, 800, 900, 1300, and 1400 include common components, entirely separate paths can be provided for different radar types (e.g., a separate path for a first polarization and a second polarization type and a separate path for X band and W band in one embodiment). Independent radar systems for dual polarization, or dual/tri-band frequency diversity, or both can be self-contained coherent systems in some embodiments.

In some embodiments, the ratio of phase can also be utilized for both dual polarization and/or dual frequency systems. Specific differential phase can be used to identify characteristics associated with HAIC and HAIC$^2$ in certain embodiments. conditions.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

According to various exemplary embodiments, electronics 304 may be embodied as hardware and/or software. In exemplary embodiments where the processes are embodied as software, the processes may be executed as computer code on any processing or hardware architecture (e.g., a computing platform that can receive reflectivity data from a weather radar system) or in any weather radar system such as the WXR-2100 system available from Rockwell Collins, Inc. or an RDR-400 system available from Honeywell, Inc. The processes can be performed separately, simultaneously, sequentially or independently with respect to each other.

While the detailed drawings, specific examples, detailed algorithms and particular configurations given describe preferred and exemplary embodiments, they serve the purpose of illustration only. The inventions disclosed are not limited to the specific forms and equations shown. For example, the methods may be performed in any of a variety of sequence of steps or according to any of a variety of mathematical formulas. The hardware and software configurations shown and described may differ depending on the chosen performance characteristics and physical characteristics of the weather radar and processing devices. For example, the type of system components and their interconnections may differ. The systems and methods depicted and described are not limited to the precise details and conditions disclosed. The flow charts show preferred exemplary operations only. The specific data types and operations are shown in a non-limiting fashion. Furthermore, other substitutions, modifications, changes, and omissions may be made in the design, operating conditions, and arrangement of the exemplary embodiments without departing from the scope of the invention as expressed in the appended claims.

Some embodiments within the scope of the present disclosure may include program products comprising machine-readable storage media for carrying or having machine-executable instructions or data structures stored thereon. Such machine-readable storage media can be any available media which can be accessed by a general purpose or special purpose computer or other machine with a processor. By way of example, such machine-readable storage media can include RAM, ROM, EPROM, EEPROM, CD ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable storage media. Machine-executable instructions include, for example, instructions and data which cause a general purpose computer, special purpose computer, or special purpose processing machine to perform a certain function or group of functions. Machine or computer-readable storage media, as referenced herein, do not include transitory media (i.e., signals in space).

What is claimed is:

1. An aircraft hazard warning system, comprising:
    a processing system associated with an active radar system configured to detect a high altitude ice crystal (HAIC) or high altitude ice crystal cloud (HAIC$^2$) condition using at least two types of radar signals, wherein a first type of radar return and a second type of radar return are processed to: 1. determine a size of particles in a high altitude region for detecting at least one of the HAIC or HAIC$^2$ condition where a larger size indicates the at least one of the HAIC or HAIC$^2$ condition; or 2. determine a shape of the particles for detecting the at least one of the HAIC or HAIC$^2$ condition where a less spherical shape indicates the at least one of the HAIC or HAIC$^2$ condition, wherein the processing system causes a display to provide at least one of a HAIC or HAIC$^2$ warning in response to detection of the at least one of the HAIC or HAIC$^2$ condition;
    a downconverter;
    a receiver;
    an antenna system comprising an X band antenna having first elements for a first polarization signal in an X band and second elements for a second polarization signal in the X band and a W band antenna for a signal in the W band, the W band antenna being disposed in a face of the X band antenna;
    a duplexer, wherein a first path and a second path is disposed between the downconverter and the duplexer, wherein the first path is for the first type of the return from a first type of radar signal of the two types of radar signals and the second path is for the second type of return from a second type radar signal of the two types of radar signals, wherein the first type of radar signal is the first polarization signal in the X band and the second type of radar signal is the second polarization signal in the X band or the first type of radar signal is in the X band and the second type of radar signal is the signal in the W band.

2. The aircraft hazard warning system of claim 1, wherein the two types of radar signals comprise the first polarization signal in the X band and the second polarization signal in the X band.

3. The aircraft warning system of claim 1, wherein the two types of radar signals comprise the first type radar signal being at a first polarization and the second type radar signal being at a second polarization.

4. The aircraft warning system of claim 3, wherein the HAIC condition is detected using the at least two types of radar signals after a region of interest is identified.

5. The aircraft warning system of claim 1, wherein the processing system determines a region of interest using an inferred process.

6. The aircraft hazard warning system of claim 5, wherein the inferred process uses a temperature anomaly detection.

7. The aircraft hazard warning system of claim 2, wherein the first type radar signal is an X band frequency and the second type radar signal is a millimeter Ka, or W band frequency.

8. The aircraft hazard warning system of claim 3, wherein the first polarization signal is an H polarization signal and the second polarization signal is a V polarization signal.

9. The aircraft hazard warning system of claim 8, wherein the antenna system is an active scanning array antenna system.

10. The aircraft hazard warning system of claim 9, wherein the antenna system is electronically steerable.

11. A method of detecting a high altitude ice crystal (HAIC) condition or a high altitude ice crystal cloud (HAIC$^2$) condition on an aircraft using an electronic processor associated with an active radar system, the method comprising:
    providing a first type of radar signal to an antenna system, the antenna system comprising an X band antenna having first elements for a first polarization signal in an X band and second elements for a second polarization signal in the X band and a W band antenna for a signal in the W band, the W band antenna being disposed in a face of the X band antenna;
    providing a second type of radar signal to the antenna system;
    receiving a first type of radar return from the first type of radar signal on a first receive path and a second type of radar return from the second radar signal on a second receive path;
    processing the first type of radar return and the second type of radar return to determine at least one of HAIC or HAIC$^2$ condition, wherein the first type of radar return and the second type of radar return are processed to: 1. determine a size of particles in a high altitude region for detecting the HAIC or HAIC$^2$ condition where a larger size indicates at least one the HAIC or HAIC$^2$ condition; or 2. determine a shape of the particles for detecting at least one of the HAIC or HAIC$^2$ condition where a less spherical shape indicates the at least one of the HAIC or HAIC$^2$ condition; and displaying at least one of a HAIC or HAIC$^2$ warning in response to detection of the at least one of the HAIC or HAIC$^2$ condition.

12. The method of claim 11, wherein the HAIC warning of the HAIC condition is provided on a weather radar display.

13. The method of claim 12, wherein the electronic processor is part of an avionic weather radar system.

14. The method of claim 11, wherein the first type radar return is associated with a first frequency and the second type radar return is associated with a second frequency.

15. The method of claim 11, wherein the first type radar return is associated with a first polarization and the second type radar return is associated with a second polarization.

16. The method of claim 11, wherein the HAIC warning of the HAIC condition is provided as a speckled region on a plan view display.

17. An active aircraft weather radar system, comprising:
a display;
a radar antenna for receiving two types of radar return signals; and
means for determining a high altitude ice crystal (HAIC) condition in response to at least the two types of radar return signals, wherein the two types of radar return signals are processed to: 1. determine a size of particles in a high altitude region for detecting at least one of the HAIC condition where a larger size indicates the HAIC condition; or 2. determine a shape of the particles for detecting the HAIC condition where a less spherical shape indicates the HAIC condition, wherein the processing system causes the display to provide a HAIC warning in response to detection of the HAIC condition;
a downconverter;
a receiver;
an antenna system comprising an X band antenna having first elements for a first polarization signal in an X band and second elements for a second polarization signal in the X band and a W band antenna for a signal in the W band, the W band antenna being disposed in a face of the X band antenna;
and
a duplexer, wherein a first path and a second path is disposed between the downconverter and the duplexer, wherein the first path is for a first type of return of the two types of radar return signals and the second path is for a second type of return of the two types of radar return signals, wherein the first type of radar signal is the first polarization signal in the X band and the second type of radar signal is the second polarization signal in the X band or the first type of radar signal is in the X band and the second type of radar signal is the signal in the W band.

18. The weather radar system of claim 17 wherein the display provides weather images.

19. The aircraft weather radar system of claim 17, wherein a high altitude associated threat (HAAT) is sensed and a warning of the HAAT condition is displayed.

20. The aircraft weather radar system of claim 19, wherein the warning of the HAIC condition is provided in response to a comparison of the two types of returns.

* * * * *